United States Patent [19]
Friedel

[11] 3,959,800
[45] May 25, 1976

[54] UNITARY PHOTOGRAPHIC LETTERING AND DISPLAY TYPOGRAPHY DEVICE

[76] Inventor: Murray Friedel, 18356 W. Dixie Highway, North Miami Beach, Fla. 33160

[22] Filed: Feb. 27, 1975

[21] Appl. No.: 553,893

Related U.S. Application Data

[63] Continuation-in-part of Ser. No. 473,877, May 28, 1974, abandoned.

[52] U.S. Cl. .......... 354/5; 354/15
[51] Int. Cl.[2] .......... B41B 13/00; G03B 17/06
[58] Field of Search .......... 354/5, 13, 14, 15

[56] References Cited

UNITED STATES PATENTS

| | | | |
|---|---|---|---|
| 3,080,802 | 3/1963 | Friedel | 354/5 |
| 3,115,815 | 12/1963 | Friedel | 354/5 |
| 3,286,608 | 11/1966 | Friedel | 354/14 |
| 3,296,948 | 1/1967 | Sausele | 354/14 |
| 3,516,740 | 6/1970 | Clapp | 354/5 |
| 3,602,116 | 8/1971 | Moyroud | 354/15 |
| 3,791,271 | 2/1974 | Nishikawa | 354/13 |

FOREIGN PATENTS OR APPLICATIONS

| | | | |
|---|---|---|---|
| 679,930 | 9/1952 | United Kingdom | 354/13 |

*Primary Examiner*—Stephen J. Tomsky
*Attorney, Agent, or Firm*—Gustave Miller

[57] ABSTRACT

This apparatus is a unitary photographic lettering and display typography composing device and has as its objective the creation and mechanical combining of two adjacent master and slave photo typographic systems into one unitary, simultaneously controlled photographic, daylight operating lettering composing device that can produce display headings, captions and sub-heads in either English or foreign languages, on a full sheet of photographic paper. Because of its constantly yellow-illuminated character image that develops into a black character image instantly upon exposure to white light and its visible spacing control, its transverse and longitudinal motion adjustability of the photographic paper, it also lends itself to the composition of Semitic and Oriental languages, border designs, overall background pattern tint effects and engineering symbols.

Each character is constantly projected in the master unit from a yellow safety light source and is visually spaced to the desired position. The character is instantly developed upon exposure by white light and appears as a black image. The operator continues to compose one character after another without concern as to the sensitized material on which the photographic composition is viewed becoming spoiled and unusable from overdevelopment, overexposure, exposure to extraneous light and/or overall fogging from lengthy interruption during composition. This advantage results from the use of the composing photographic sheet which the operator views only as a basic spacing control sheet and which is discarded when composition is completed. A second sheet of dry photographic paper in an adjacent darkroom slave unit apparatus receives a simultaneous latent image exposure in the exact size, position, spacing or overlap as the developer immersed spacing control photo paper sheet. The dry photo paper is subsequently developed, resulting in a sharp, accurate, identically composed, good contrast, finished duplicate suitable for reproduction.

With this unitary twin photographic lettering and display typography composing device, rapid font character selection is achieved by merely rotating a font character selection dial which is connected to the negative film font disks of both systems.

A single font shifting lever which shifts from the outer to the inner concentric ring of the alpha-numeric characters on both identical master and slave font character disks at the same time, allows for rapid combining of different types of font characters such as Roman (vertical) and Italic (slanted) for instant mixing of composed words on a common base line.

With this photographic lettering and display typography composing device, whether the operator leaves the machine for short or long periods - from less than a minute to longer than a week - the visual images already composed will be retained and the photo paper will not lose its light sensitivity for the balance of the composition. Each latent image of a font character exposed onto the photo paper in the slave unit, after subsequent development within the machine, will be uniform in weight, sharpness, contrast and density.

22 Claims, 29 Drawing Figures

FIG 1

MASTER
ON
EXP
R
E 11
46
50
12
88
52
48
47
51
51B
48A
48B
48C
48D
48E
48F
10A
31
87

UNITARY PHOTOGRAPHIC LETTERING AND DISPLAY TYPOGRAPHY DEVICE

This application is a streamlined continuation-in-part of application Ser. No. 473,877 filed May 28, 1974, now abandoned.

BACKGROUND OF THE INVENTION

It is well known art to photographically project or to contact print a series of font characters from a negative film font upon a piece of sensitized paper until a complete message has been exposed onto a photographic paper emulsion. However, to produce a full magazine-size page of display typography on a full sheet of photo paper with some of the ascending and descending parts of the characters interlocking or overlapping vertically from line to line, existing daylight functioning machines are unsatisfactory for many reasons. In existing machines the completed, overlapped display typography on a full sheet of photographic paper can be accomplished only by a commercial artist who must perform tediuos, expensive, time-consuming labor which requires cutting apart, mechanical paste-up, manual artwork then photostating the composition, to accomplish the desired final result.

In the present state of the art, an operator who is called away from an incompleted composition could lose continuity of the copy and misspell words on a blind operating device, could create overdevelopment, fog and streaks on a constantly wet photo paper machine, and/or have the previous character images disappear on a phosphorescent character image retaining machine.

In the present state of the art, daylight operating photo lettering and display typography composing devices with visual spacing facilities for display composing, are slow in font character selection. Blind operating machines have faster font character selection. However, the resulting display composition from all the existing blind machines have poor spacing and require laborious art work to complete vertically overlapped line-over-line display typography.

The devices that are slow in font character selection use either a negative film front strip on two reels which requires hand winding back and forth past the light path area to visually select the desired character, or a rigid framed negative film font that requires transverse and longitudinal movement past the light path area for visual selection of the desired character.

One form of a present device provides visual composition control, but functions only in a darkroom and requires wiping on of a photographic developer to the sensitized material. The result is a product with variation in character density caused by uncontrollable development time, with greater development time for the initially composed font characters that remain on the developer-wetted paper for a longer time, and the possibility of background fog and streaking from extraneous light. Precise spacing control is difficult under darkroom lighting conditions with this machine.

Another form of a photo lettering and display typography device functions in daylight, employing an excited phosphor character image of the previously imprinted character as a spacing guide. However, the phosphorescent image is of short duration and, as a result, line-over-line composition which requires long duration retention of the excited font character images is impossible.

Another known photo lettering and display typography device is limited to the use of a two-inch wide strip of sensitized paper which is immersed under a layer of developer solution for the entire composition period, Friedel, U.S. Pat. No. 3,115,815, FIG. 6, No. 16. Overdevelopment of the initial characters results from long duration, small character composition such as line-over-line copy within the limited confines ot the 2-inch paper strip.

Another presently known photo lettering and display typography device employs a two-paper method utilizing a photographic developer-wetted paper for visualization and a dry-image paper subsequent processing into the finished copy. This device operates only in a darkroom and is slow because the operation requires additional motions for the first exposure of the font character on the wetted paper, removal of the exposed wet paper from the image path, a second exposure on dry paper, return of the wet paper and so on with subsequent processing of the dry paper after the entire composition is completed.

Another photo lettering and display typography device of the present art has rapid character selection, functions in daylight, but is operated totally blind without visual operator spacing control.

The poor, fixed, non-kernable spacing of the characters subsequent to imprinting on all blind operating devices, requires the cutting apart of the finished composition and repositioning, cementing and retouching of the characters to achieve overlap and good spacing. Since no visual indications of the prior imprinted characters are visible to the operator, spelling errors resulting from interruption of forgetfulness also occur.

OBJECTS OF THE INVENTION

It is an object of the present invention to provide a unitary photographic lettering and display typography composing device which is operable in normal room lighting and overcomes the inadequacies of prior art devices. An object of the present invention is to provide a means for producing display typography composition not limited to the English language, but including foreign languages, especially Oriental and Semitic alphabets.

Another object of the present invention is to provide a unitary composing device for producing lettering and display typography on full magazine-size sheets of sensitized photographic paper.

A further object of the present invention is to provide a means for rapid font character selection by merely dialing the desired character.

Another object of the present invention is to provide a means to position a font character image that is projected from a safelight, yellow-illuminated light source onto a sensitized immersed-in-developer sheet of photo paper with the ability to place this yellow-lit image in the desired position without any development of this image onto the photo paper.

Still another object of the present invention is to provide fully visual, instantly developed, black font characters on photo paper in normal room illumination upon exposure to projected white light.

An additional object of the present invention is to provide accurate spacing control capability for visually composing line-over-line display typography in horizontally or vertically overlapped or interlocked font character composition configurations.

A further object of the present invention is to provide a means to retain light sensitivity for the entire sheet of sensitized photo paper that is submerged in the developing solution and to permit continuity of operation regardless of the length of time the unfinished composition has been interrupted.

Still another object of the present invention is to provide a simultaneous latent image in a totally dark slave unit with exact duplication of composed images on a dry sheet of sensitized photo paper for subsequent development within the unitary composing device.

A further object of the present invention is to provide a means for accurate interlocked, overlapped, selectively spaced or artistically composed line-over-line display typography without the need for manual artwork.

Still another object of the present invention is to provide a product with uniform character weight and density from the first character to the last, regardless of the quantity of the copy or the length of time interruptions.

Another object of the present invention is to provide font character enlargement capability with automatic exposure light control throughout the entire enlargement range on the dry side latent image photo paper section.

A further object of the present invention is to provide a system that will complete the entire cycle of the varying electrical and electronic sequences on both the master (wet) side (visual), and the slave (dry) side (blind), typography imprinting systems by the depression of a single electrical button within a one-second total time duration per font character.

Still another object of the present invention is to provide instant selection of the Roman (vertical) or Italic (slanted) font characters, simultaneously, from the identical font character disks for mixing the vertical and slanted font characters in typography composition and to instantly and accurately register them on the same common base line.

It is also an object of the present invention, to provide a means for the use of a minimal quantity of a preferred stagnant photographic developer to complete full sheets of composition without the need of developer replenishment or replacement until complete exhaustion of the developer occurs.

An additional object of the present invention is to provide for the elimination of effects of development desensitization created by concentrations of bromide ion acting as photographic restrainers in the areas adjacent to the instantly developed black image of the font character. (The term BROMIDE ION is fully defined in a subsequent section.)

A further object of the present invention is to have the developer-wetted entire sheet of contact speed photo paper remain light sensitive for a length of time after the operation is interrupted and prior to the completion of the typography composition.

A further object of the present invention is to provide a means of achieving a half-second or less exposure time of a projected image onto a non-projection type, slow contact chloride photographic paper and to visibly disclose to the operator, the appearance of an instantly developed, black spacing control font character image under normal room illumination.

A still further object of the present invention is to provide a means for an unskilled operator without any art training, to produce line-over-line, overlapped or inter-connected full page display typography composition, eliminating the need for a commercial artist to manually retouch pasted-up character overlap connections.

A still further object of the present invention is an improvement over this inventor's prior inventions, Friedel, U.S. Pat. Nos. 3,115,815, 3,080,802 and 3,286,608, as well as other machines in this category, as for example, U.S. Pat. Nos. 2,787,201 and 2,649,036.

BRIEF SUMMARY OF THE INVENTION

The main feature of the invention is the mechanical combining of two dissimilar photographic lettering and display typography systems into one unitary, inter-connected and simultaneously controlled composing device. The master (wet) side system imprints an instantly developed black font character image on a sensitized photo paper immersed in developer, as a guide for visual font character spacing control by the operator, in normal room illumination. The slave (dry) side system responds as a slave unit which functions in total darkness and simultaneously imprints an exact, duplicated latent font character image onto a dry sheet of sensitized photo paper for subsequent development upon completion of the entire composition.

With this photographic lettering and display typography composing device, a non-skilled worker without any art training can produce a full magazine-size page of overlapped, interlocked or line-over-line full page display composition, and can accomplish same in daylight since the operator can see each character, each word, each space, each overlap and each completed line at all times during the composition in normal room illumination, from the very first character to the very last line, over the entire photographic paper sheet which is constantly immersed in a preferred developer solution.

A FEATURE OF THE SLAVE (DRY) SIDE SYSTEM OF THE PRESENT INVENTION is the simultaneous and exact positioning of each font character projected from a point source light through true optical condensing system lenses, through the font character, through the projection lens, onto a dry sheet of photo paper for retention of the latent font character images for subsequent development within the composing device.

Another feature of the slave (dry) side system of the present invention, is its use of a clear acrylic plastic such as plexiglass, one and one-eighth inch thick solid optical plate as a weight for retaining the latent image dry photographic paper in place and, at the same time, optically compensating for the increased thickness of the master (wet) side developer tank. The compensation is necessary as the combination of the wet side ⅛ inch thickness of developer solution with one inch of clear acrylic plastic into a unitary, optical, light-transmitting thickness adds a slight magnification to the projected image.

A further feature of the slave (dry) side system of the present invention is its use of hand access cuffs shown in Friedel, U.S. Pat. No. 3,291,020, FIGS. 32 and 36, for loading and unloading, and the development of the bromide-speed stabilization photo paper through a stabilization processor, also shown in Friedel, U.S. Pat. No. 3,291,020, FIG. 24, for the final photo print of display typography with good reproduction quality.

A still further feature of the slave (dry) side system of the present invention is its use of an automatic diaphragm control device to compensate for a bellows extension at various font character sizes, maintaining a fixed, automatically reset exposure time throughout the entire range of enlargement.

A FEATURE OF THE MASTER (WET) SIDE SYSTEM OF THE PRESENT INVENTION is an instantly developed black, visible font character image upon exposure to white light for subsequent single font character-to-character composition spacing control.

Another feature of the master (wet) side system of the present invention is a constantly projected font character image onto the photographic paper by a safelight yellow illumination.

A further feature of the master (wet) side system of the present invention is its use of a developer-filled inverted tank or block within which the visual yellow projected image is constantly in view of the operator and to which this font character is exposed onto sensitized photo paper by white light.

An additional feature of the master (wet) side system of the present invention is its use of a solid block of clear 1-inch thick acrylic plastic, such as plexiglas, with spacing buttons inserted under each corner to elevate it ⅛ inch over the sensitized paper, forming an inverted development tank when the developer is added, i.e., the developer solution lies on top of the sensitized paper and is, itself, covered by the acrylic plastic block.

Still another feature of the master (wet) side system of the present invention is its use of a transparent sheet of yellow amber acrylic plastic as a viewing window so that the entire composing operation remains continuously visible to the operator.

Another feature of the master (wet) side system of the present invention is the utilization of the 'hot spot' center area, high intensity light of a photo flood lamp, through an unconventional condensing system consisting of two condensing lenses with dissimilar focal lengths, and wire both convex surfaces facing the photo flood 'hot spot.' This system, used with a fully open f 2.5 lens and making use of the hypersensitization that is created in the emulsion of a contact speed chloride photo paper constantly immersed in a preferred developer solution at an elevated temperature of 135° F., and in an improved developer formula over this inventor's prior patent, Friedel, U.S. Pat. No. 3,115,815, makes possible the instant development of projected characters upon a non-projection, slow speed chloride contact photographic paper.

A further feature of the master (wet) side system of the present invention is the retention of the light sensitivity of the contact speed photo paper after typography composition has been interrupted for an unlimited period. The photo paper emulsion will remain light sensitive and the operation can continue over the entire area of the full sheet of photo paper.

A further feature of the master (wet) side system of the present invention is the use of punched alignment holes on one edge of the sensitized chloride photo paper to fit onto alignment pins for registration and, also, to keep the photo paper from moving durng the agitation cycle.

A still further feature of the master (wet) side system of the present invention is an elevated temperature, thermostatically controlled (135°F) heating pad for the photographic developing solution. The pad is mounted directly under the photo paper easel tray and makes possible an instantly developed black image of each font character exposed by white light.

A FEATURE OF THE COMBINED ADJACENT MASTER AND SLAVE SYSTEMS OF THE PRESENT INVENTION AS AN INTEGRAL UNIT is its use of two identical negative character-bearing font disks that are geared together to place the identical selected character into the respective projection light path openings. Both font disks are also rotated in exactly duplicated motion by the font character selector dial.

Another feature of the combined adjacent systems of the present invention is its versatility in the use of font disks (and corresponding selector dials) which produce foreign language display typography including the Oriental and Semitic languages, single art elements into border designs and overall background tints, engineering symbols, musical notes and symbols, etc. and is, therefore, not limited to English language characters.

A further feature of the combined adjacent master and slave systems of the present invention as a unit is the dissimilar thicknesses of the clear acrylic, solid plastic blocks. As a slight magnification is created by projecting an image through clear acrylic plastic in both adjacent systems, the 1 inch thickness of the master (wet) side combined with the ⅛ inch of the developer increases the optical thickness of the wet side to 1 and ⅛ inches. Therefore, for equal magnification, the slave (dry) side acrylic block is increased to 1 and ⅛ inches.

A further feature of the unitary combined adjacent master and slave systems of the present invention as a unit is the provision of simultaneous exact enlargement of the projected identical font character images in each of the respective master and slave (wet and dry) side photo paper easel sections.

An aditional feature of the unitary combined adjacent systems of the present invention is its electrically operated system which controls the opening of the jaws of two positive register locks that permit the release of the font character disks for rotatably selecting the next desired font character, following which the positive register locks with their tapered locking pins position the selected characters directly in the center of the respective project light paths.

A still further feature of the unitary combined adjacent master and slave systems of the present invention is its provision of a single exposure switch that, when depressed, provides within an elapsed time of one second, the automatic electrical and electronic sequences for each selected font character through a single rotation of a motorized, rotary programmer consisting of a multiple set of stacked cams and microswitches for energizing and deenergizing of the various electrical and electronic elements as are further described herein in exact sequential detail.

An additional feature of the unitary combined adjacent master and slave systems of the present invention is its use of two sets of light-tight cuffs for loading and removal of the sensitized materials in the adjacent systems, Friedel, U.S. Pat. No. 3,291,020, FIGS. 32 and 36.

Another feature of the unitary combined adjacent systems of the present invention is a heating element located in the storage cabinet base to maintain the same elevated temperature (135°F) of the stored, bottled, fresh developing solutions so as to eliminate heating time when the operator requires fresh developer in the master (wet) side system for immediate use.

Another feature of the unitary combined adjacent systems of the present invention is a font character shift mechanism permitting use of either of the two concentric rings of alpha-numeric characters on each identical font disk for mixing the type composition simultaneously in both of the adjacent systems, as for example, combining the Roman (vertical) and the Italic (slanted) characters of similar design without changing fonts or utilizing anamorphic lenses.

A still further feature of the unitary adjacent master and slave systems of the present invention is the provision of a longitudinal motion mechanism and transverse motion mechanism for accurate movement and control of the position of the sensitized material relative to the optical paths for line-over-line simultaneous and exact composition on both of the adjacent systems.

Another feature of the two adjacently combined systems of this invention is the interchangability in manufacture of the master and slave (wet and dry) systems to the opposite sides of each other in order to accommodate either left-handed or right-handed operators.

It is to be noted, in considering the description and the drawings, that those portions of this machine which are well known in the art and present no novelty, are described and shown generally, without full detail, since they represent as example: photographic projection, focusing means, electrically connected elements and other components commonly used in the art and well understood. The novel features of this invention are, on the other hand, fully described and detailed in a subsequent section.

BRIEF DESCRIPTION OF THE DRAWINGS

In the accompanying drawings, forming a part hereof, is illustrated a preferred embodiment of the invention in which drawings with similar reference characters designate corresponding parts and in which.

DETAILED DESCRIPTION OF THE PREFERRED EMBODIMENTS

Figures 1, 1A:
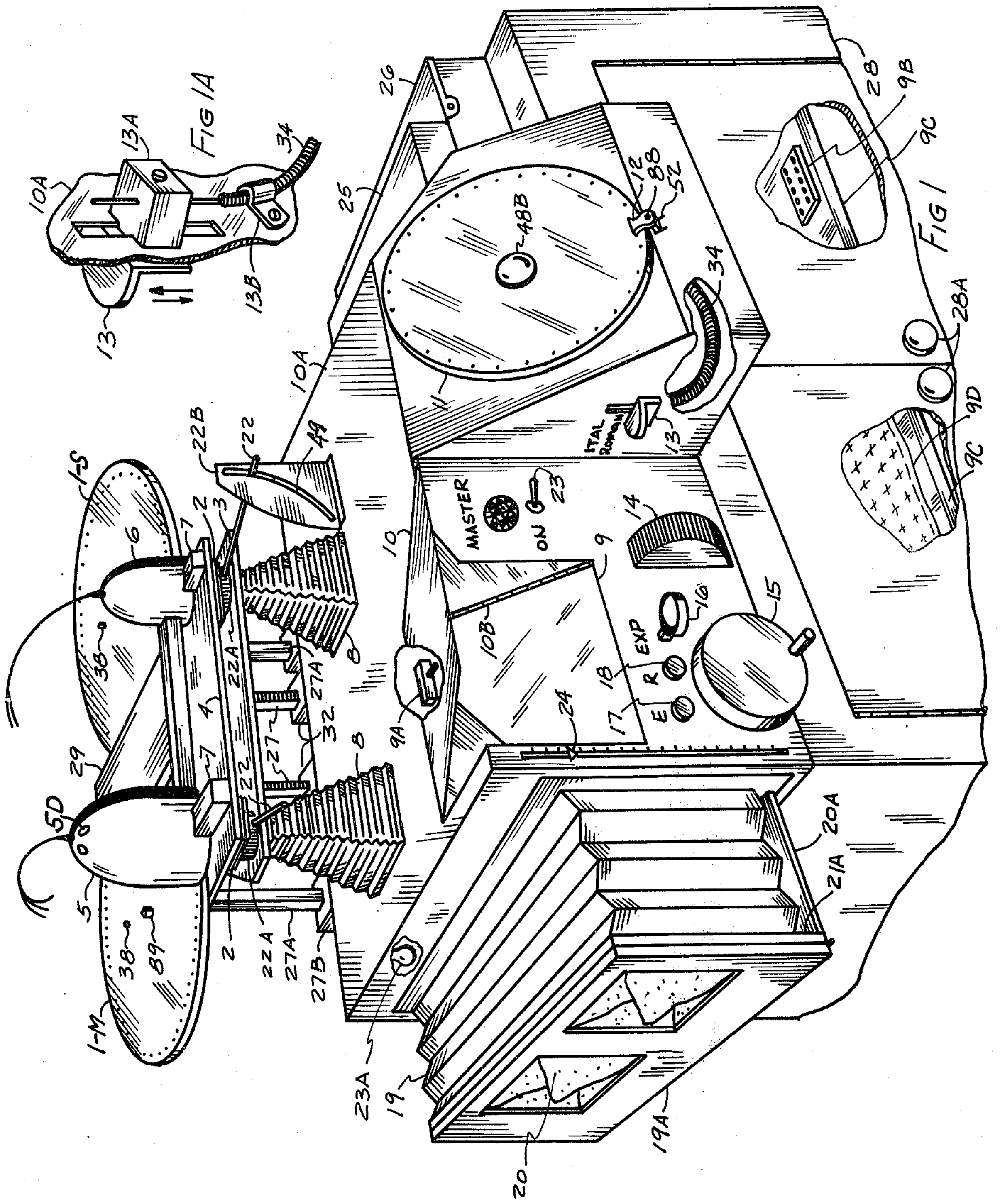
FIG. 1 is a perspective view of a complete embodiment of the entire apparatus in accordance with the present invention showing front, left and top sides thereof.
FIG. 1A is a perspective internal view of the remote control font disks shifting mechanism that shifts both fonts simultaneously.
Figures 2, 2A, 2B:
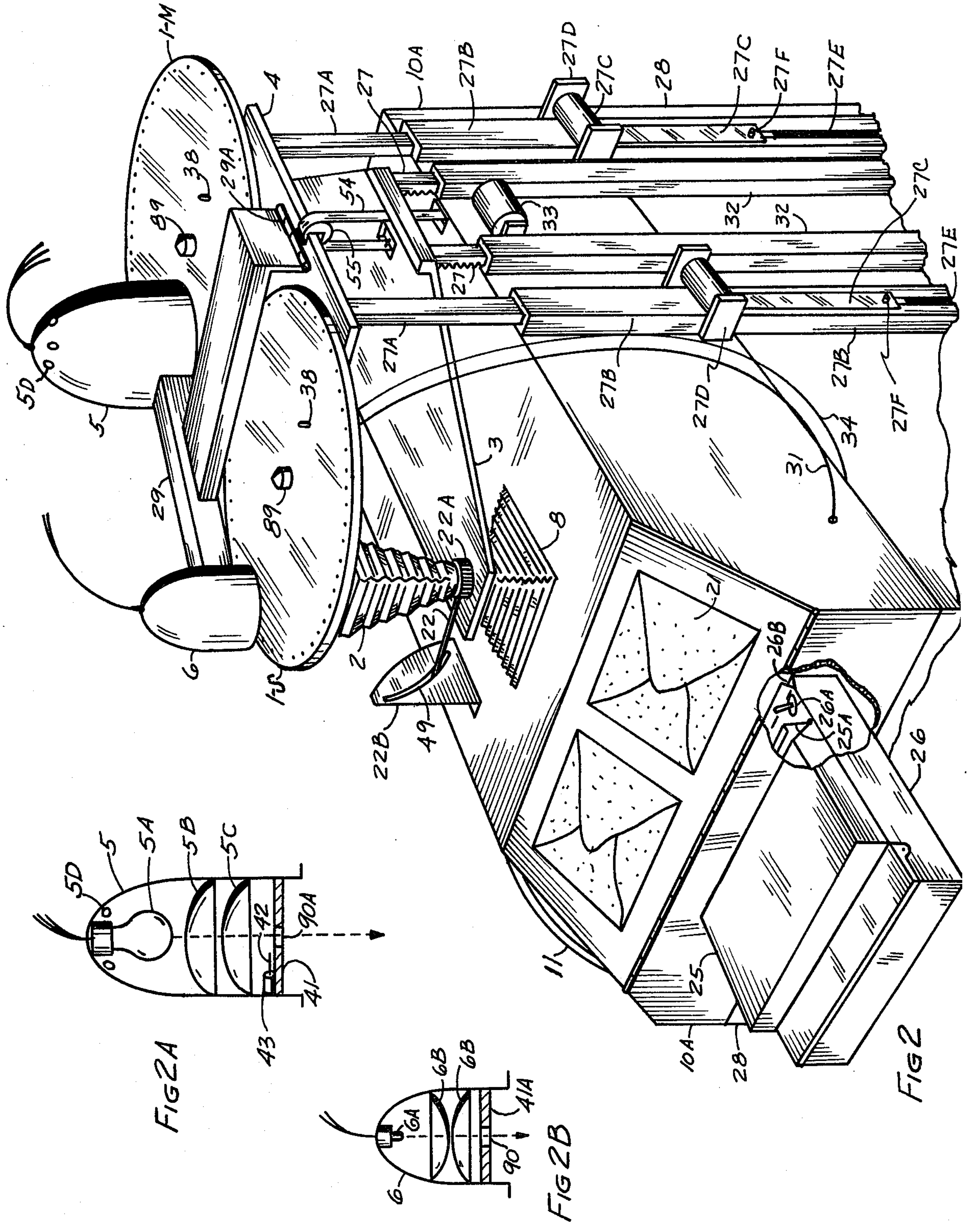
FIG. 2 is a perspective view of the device showing the right side, top and rear configurations thereof.
FIG. 2A is a cross-sectional view of the master (wet) side projection lighting system and housing.
FIG. 2B is a cross-sectional view of the slave (dry) side projection lighting system and housing.
Figure 3B:
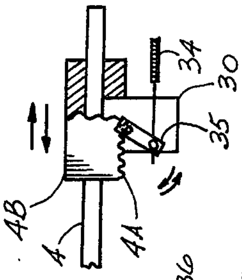
FIG. 3B is a cross-sectional view of the font shift mechanism as attached to the font disks shifting plate.
Figure 3A:
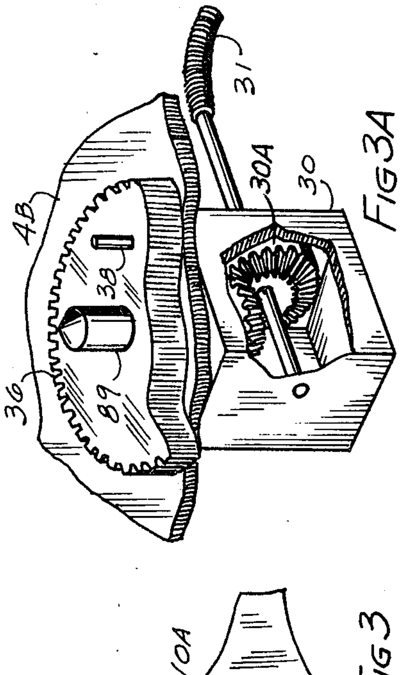
FIG. 3A is a cutaway perspective view of the bevel gears and the flexible shaft that control the rotation of the identical font disks.
Figure 3:
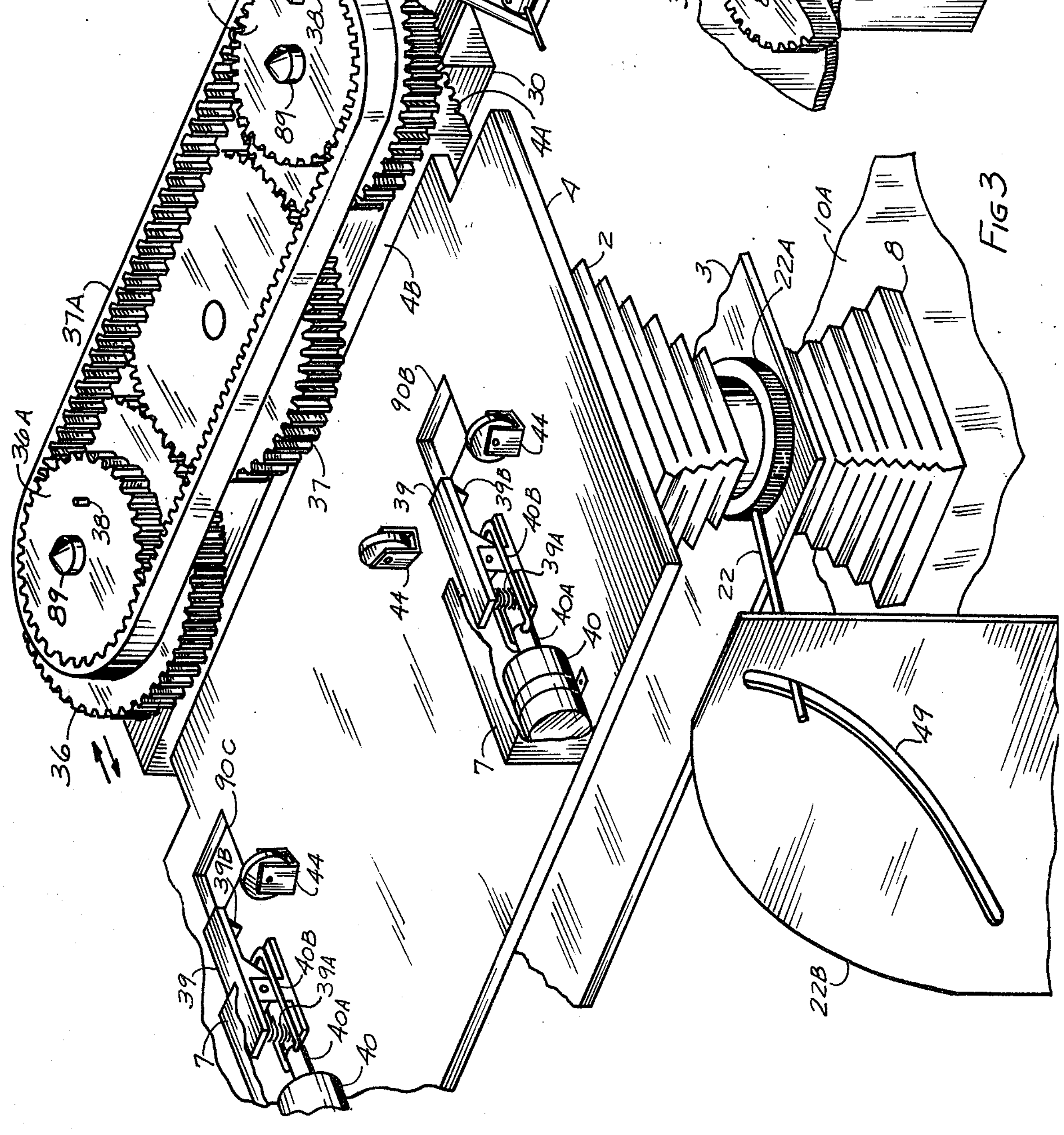
FIG. 3 is a cutaway perspective view at a right angle to FIG. 1, of the belted and geared twin font drive which is beneath the identical fonts of FIG. 1, the font disks shifting mechanism, the two font disks locking and releasing devices and the two aperture openings.

Referring to the drawings, the detail of the structure of this Unitary Photographic Lettering and Display Typography Composing Device and particularly to FIGS. 1, 2 and 3, the master and slave (wet and dry) sides of the two dissimilar photographic lettering and display typography composing systems, are shown as mechanically interconnected into one unitary preferred embodiment.

The font character selection section comprises the master and slave identical font disks 1-M and 1-S, and a font character selector dial 11, mechanically connected, as shown in FIG. 3, to drive both identical master and slave font disks 1-M and 1-S simultaneously. It also includes the selected character toggle stop 12, the Roman or Italic style font disks shifting lever 13, the font disks shift cable 34, the font disks shift rack 4A on the font disks shift plate 4B, the font disks shift rack and pinion lever 35, the font disks base assembly 4, the font disks centering and alignment pins 38 and 89, the font disks positive register locks 39 and their housings 7.

Font disks 1-M and 1-S and corresponding character selector dial 11 can be produced for foreign language display typography. A single artistic design element can be utilized for border design composition, and step-and-repeat overall pattern background tint designs. It can also produce Engineering symbols and musical notes, etc. and is, therefore, not limited to the English language characters.

The two concentric rings of font characters, 85 and 86, on the identical font disks 1-M and 1-S, also lend themselves to photographic lettering and display typography of Oriental languages. The outer periphery concentric ring can contain 100 major basic font characters while the inner concentric ring can contain 100 of the swirls, tails, flourishes and other required strokes to convert the 100 major basic characters into literally thousands of other characters by the interlocking, overlapping and adding on of any of the required assorted strokes from the inner concentric ring onto the outer concentric ring major basic font characters. Variously designed Oriental fonts can be used with the two concentric rings, 85 and 86, on the font disks 1-M and 1-S, all coordinated and corresponding to the font character selector dial 11.

The sensitized materials handling system comprises the slave (dry) side paper storage safe, the slave (dry) side hand access cuffs 21, the longitudinal motion spinner knob 15, the transverse motion knurled know 14, the master (wet) side hand access cuffs 20, the transversing bellow 19 and the stabilization processor 26.

The two dissimilar optical systems comprise the yellow and white light master (wet side) projection housing 5 shown in detail in FIG. 2A, the point source white light slave (dry side) projection housing 6 shown in detail in FIG. 2B, the hinged bracket 29, the identical upper bellows 2, the dual lensboard assembly 3, the identical lower bellows 8, the two dissimilar master and slave (wet and dry) side lenses 22A, the lens diaphragm manual control lever 22, the automatic diaphragm control 22B, the white light exposure switch 16 and the master switch and pilot light 23.

Figure 12:
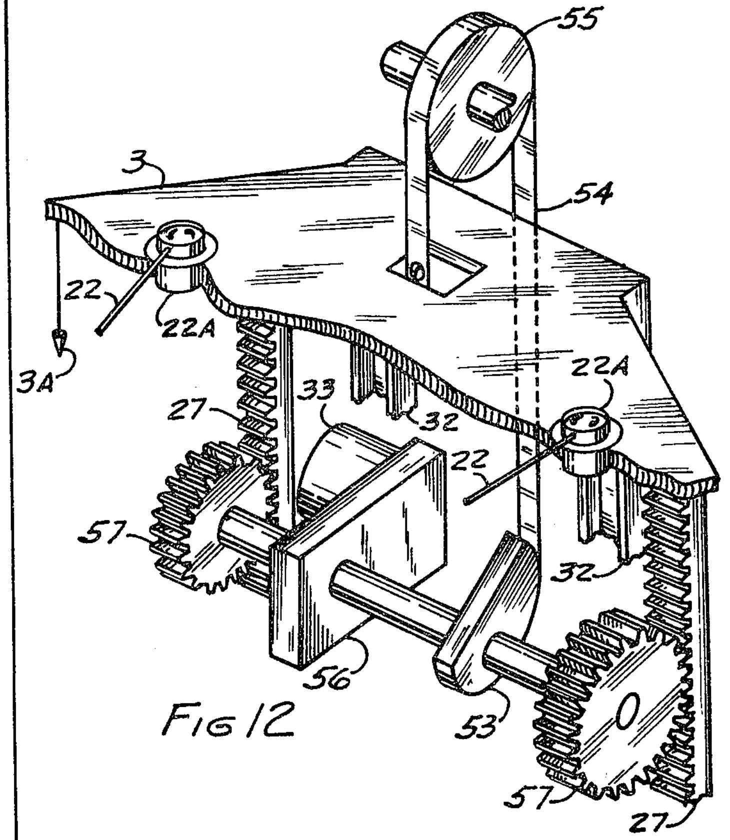
FIG. 12 is a diagrammatic perspective detail with the motor driven rack and pinion cam assembly brought forward to show more detail and showing a conventional automatic focus, linear and logarithmic motion mechanism and two lenses of dissimilar aperture diameters, but of identical focal lengths.

The enlargement automatic focus system shown in FIGS. 1, 2, and 12 comprises the reversible gear drive motor 33 activated by the enlarge switch 17 and the reduce switch 18, the lensboard rack slides 32, the lensboard racks 27, the font disks base assembly 4 attached to the male rods 27A telescoping in the female housings 27B and under constant upward spring force by springs 27C and held in exact logarithmic position by the strap 54 travelling rotatably around the free pulley 55 and connected to the linear motion lensboard 3. The enlarger switch 17, the reducer switch 18 and the scale and pointer 24 are best shown in FIG. 1.

The master (wet) side viewing system as the composition is in progress comprises the operator viewing window 9 and the collapsible viewing hood 10.

Figure 11C:
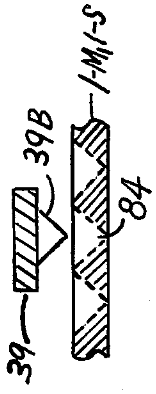
FIG. 11C is an enlarged section on line 11C - 11C of FIG. 11.
Figure 11:
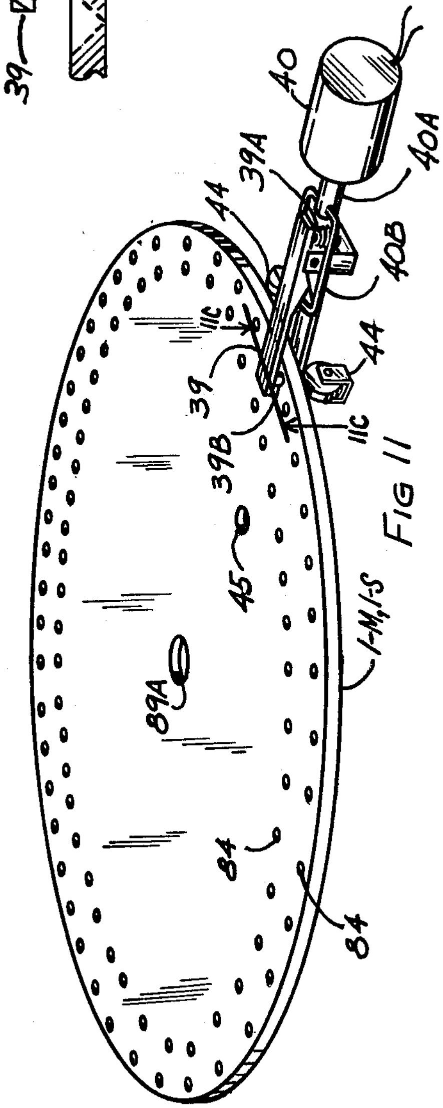
FIG. 11 is a detail perspective view of the font alignment and locking mechanism engaged in a tapered indexing hold in the outer periferal ring.
Figure 11A:
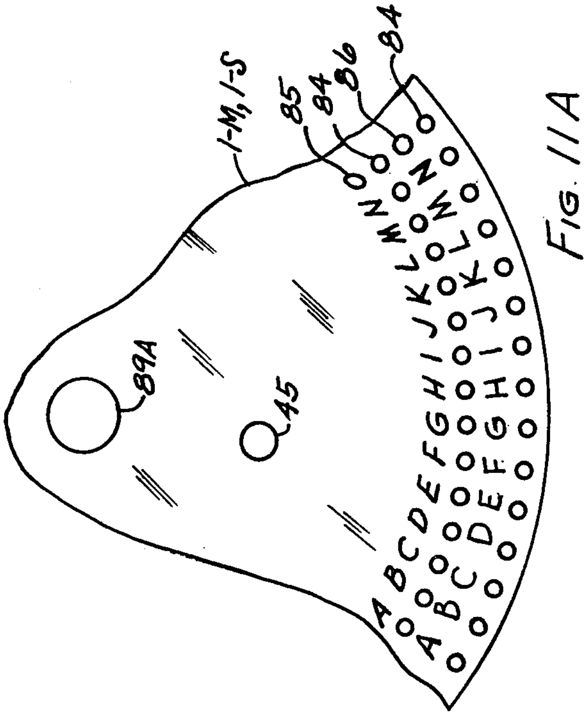
FIG. 11A is a fragmentary top plan view of a font showing the two type style font characters, the Roman (vertical) and the Italic (slanted) and their respective tapered indexing holes.

Having thus broadly described the main sections of the device, the mechanical operations and construction of the various elements within these sections are further described:

As shown in FIGS. 1, 2, 11 and detailed in FIG. 11A, each identical font 1-M and 1-S is provided with two concentric rings of alpha-numeric characters, 85 and 86. The Italic (slanted) font 85 and the Roman (vertical) font 86 are originally hand drawn and then photographed onto negative lithographic film of high contrast with the characters being clear and the background being opaque black. The vertical and slanted characters are originally drawn to the same height and weight and then photographed onto lithographic film so that they may be used in combination, simultaneously, on both twin font disks 1-M and 1-S for the composition of mixed display typography using the Roman and the Italic characters 85 and 86. The font disks 1-M and 1-S are constructed by the sandwiching of punched and die-cut polyester (stable) film font negatives which are registered between two injection molded interlocking disks of clear, rigid plastic such as polystyrene, acrylic or Plexiglas, and then bonded by ultrasonic sealing or by the use of chemical solvents such as methylchloride.

Two concentric rings of tapered register lock holes 84 are positioned and radially oriented with each font character as best shown in FIG. 11A. Each font disk 1-M and 1-S is provided with a center hole 89A and an alignment pin hole 45 for proper positioning of the font disks 1-M and 1-S onto alignment pins 38 and the central pins 89 that are pressed into the turntable gears 36 and the belt driven, geared plates 36A as shown in FIG. 3.

Referring to FIGS. 1A, 3 and 3B, the desired characters of Roman or Italic type style 85 or 86 in the identical fonts 1-M and 1-S are rapidly selected by the up-and-down sliding motion of the font shifting lever 13 that is mounted on the interior and exterior of the main housing 10A and is connected to a push-pull shift cable 34 with the terminal end of the cable 34 attached to the rack-and-pinion lever 35 which, in turn, actuates the shifting plate 4B on the font base assembly plate 4. Operator movement of the font disks shifting lever selector 13 positions the selected characters of both font disks in the direct center of all the light path apertures 90, 90A, 90B, and 90C. The pinion rod of lever 35 is extended across the entire plate 4B and is meshed in gear with the two racks 4A that are attached to the font shifting plate 4B at both ends.

The selected characters of font disks 1-M and 1-S are locked in correct alignment over apertures 90, 90A, 90B and 90C by spring return action of the positive register locks 39 with the tapered lock pins 39B engaging the tapered register lock holes 84. The twin font disks positive register locks 39 are securely mounted on the font disks base assembly plate 4 as shown in FIG. 3. The identical fonts 1-M and 1-S are supported by the font disks support roller assemblies 44 as shown in FIGS. 3 and 11 of which roller support assemblies 44 are secured to the font base assembly plate 4.

Figures 4, 5, 5A, 6, 7, 8, 9:
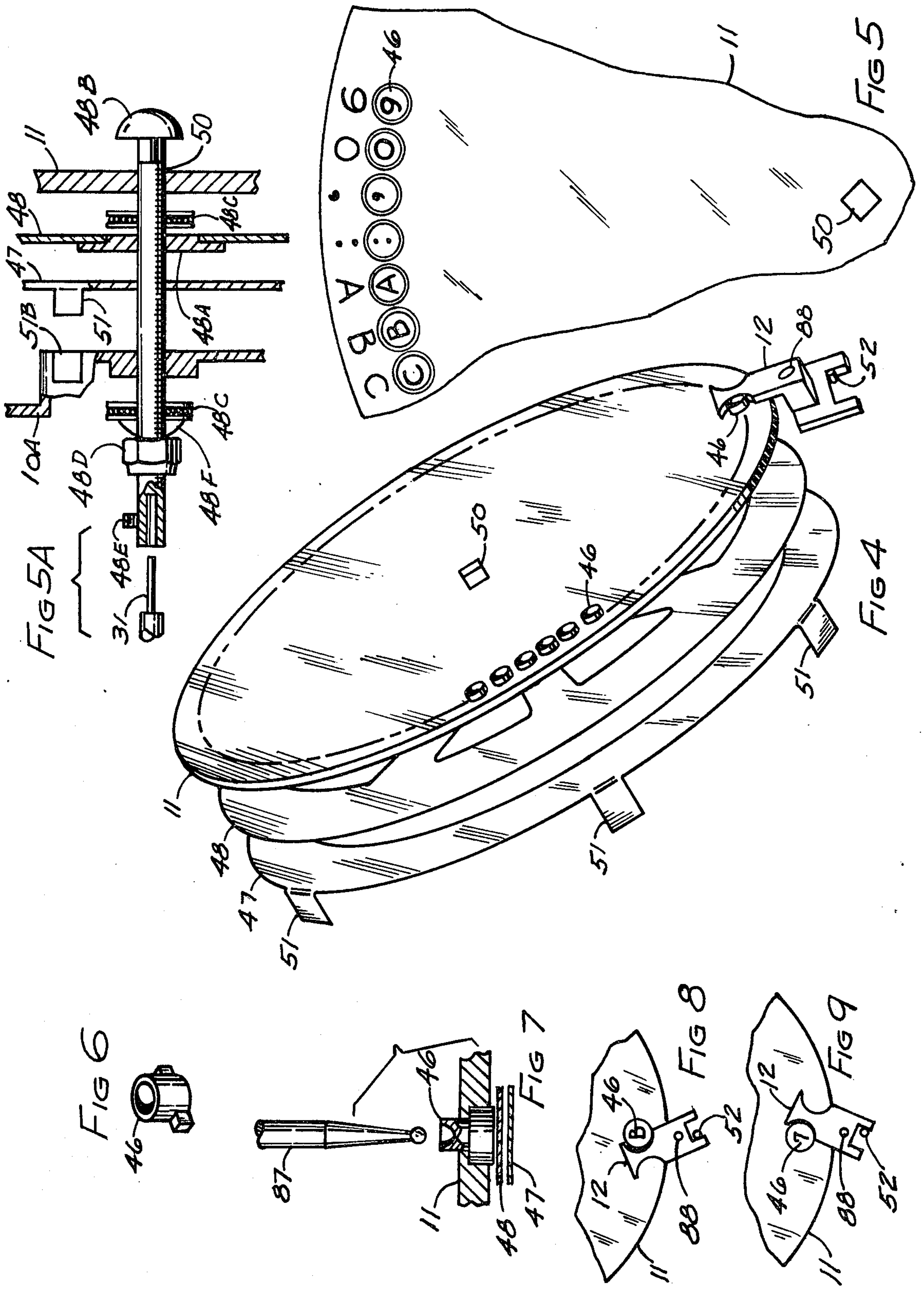
FIG. 4 is a detail perspective view of the character selection dial and the electrical contact ring and spider mechanism controlling the font alignment positive register locks.
FIG. 5 is a fragmentary top plan view of the character selection dial.
FIG. 5A is a cross-sectional, partly exploded view of the elements of the character selector dial assembly.
FIG. 6 is a perspective view of the font character selector button.
FIG. 7 is a cutaway sectional view of the font character selector button and dialing stylus and the electrical contact mechanism relationship.
FIGS. 8 and 9 are fragmentary top plan views of the font character selector stop mechanism showing clockwise and counterclockwise operability to the exact central font character alignment, regardless of the direction of rotation for character selection.

The character dialing selection mechanism is shown particularly in FIGS. 1, 3, 3A, 4, 5, 5A, 6, 7, 8 and 9. The dialing stylus 87 is inserted into the recess of the desired font character button 46 that is retained in the selector dial 11 by the brass contact spider 48. It is rotated manually either clockwise or counter-clockwise until the toggle stop 12 is limited in motion by resting against the stop pin 52 that is firmly secured and extending from the main housing 10A. The geometric configuration of the character selector button 46, pivot pin 88 and stop pin 52, limits the rotation of the selected font character button 46 at the identical position whether it is rotated clockwise or counterclockwise. This dual-directional rotation dialing system imparts faster means of character selection as the maximum distance of peripheral rotation of dial 11 need not exceed 180°. The font character selector dial 11 is directly connected to a flexible shaft 31 as shown in FIG. 5A. The distal end of the flexible shaft 31 connects with the gear box 30 which is secured to the font disks base assembly 4. The upper right angle bevel gear 30A is connected to the centering hub shaft 89 that is pressed into the turntable gear 36 and the geared plates 36A.

Rotation of the character selector dial 11 causes rotation of the identical font disks 1-M and 1-S by the meshing of the font turntable gears 36 with the idler gear 37, the timing belt geared plates 36A and the timing belt 37A. Both turntable gears 36 rotate in the same direction and both gears are of equal pitch and diameter. Motion of each gear is identical in travel direction and gear backlash is minimized by the timing belt 37A. The square opening 50 in the selector dial 11 aligns the selector dial 11 relative to the position of the identical twin fonts 1-M and 1-S on the font turntable timing belt gears 36A, centering the hubs 89 and the font alignment pins 38. The entire dialing assembly is held together and mounted on the machine as shown in FIG. 5A wherein the elements are slid onto the carriage bolt 48B in the following sequence: the character dial 11 with its square opening 50 is pressed onto the square portion under the head of the carriage bolt 48B. Following in sequence are the thrust bearing 48C and the brass electrical contact spider 48 with its spacer core 48A. The brass electrical contact ring 47 is placed onto the main housing 10A (which is constructed of a vacuum formed or injection molded, non-electrical conducting material such as polystyrene or other plastic) and is locked in position against the main housing 10A by the mounting tabs 51 being inserted into the tab retainer recesses 51B. The thrust bearing 48C is next placed on the protruding end of the carriage bolt 48B with the tempered spring washer 48F and the threaded stop nut 48D following. The flexible shaft 31 is inserted into the hollow end of the carriage bolt 48B and secured with set screw 48E. The tightening of the threaded stop nut 48D allows for the free dual-directional rotation of the carriage bolt 48B, font selector dial 11, the steel balls and one retaining disk of each two thrust bearings 48C, and the flexible shaft 31. All other elements of the assembly remain stationary.

The electrical contact of the dialing mechanism, shown in FIG. 7, illustrates that slight vertical pressure of the dialing stylus 87 in the teflon character selector button 46 causes electrical contact on the outer periphery between the spider 48 and the brass contact ring 47. Closing this electrical circuit energizes the solenoids 40 as shown in FIGS. 3 and 11. Solenoids 40 open the jaws of the positive register locks 39, allowing for free rotation of the identical fonts 1-M and 1-S.

The dialing stylus 87 is removed when it contacts the toggle stop 12. Removal of the dialing stylus 87 opens the electrical circuit to solenoids 40 enabling the jaws of the positive register locks 39 to close, inserting the tapered lock pins 39B into the tapered register lock holes 84 and accurately positioning the selected font characters simultaneously on both twin fonts 1-M and 1-S. Electrical activation of the solenoids 40 creates an inward motion of the solenoid shafts 40A, pulling open the metal frames 40B which creates a wedging action against positive register locks 39. Deenergizing of the solenoids 40 returns the positive register lock jaws 39 by expansion action of the compression spring 39A.

Figure 10:
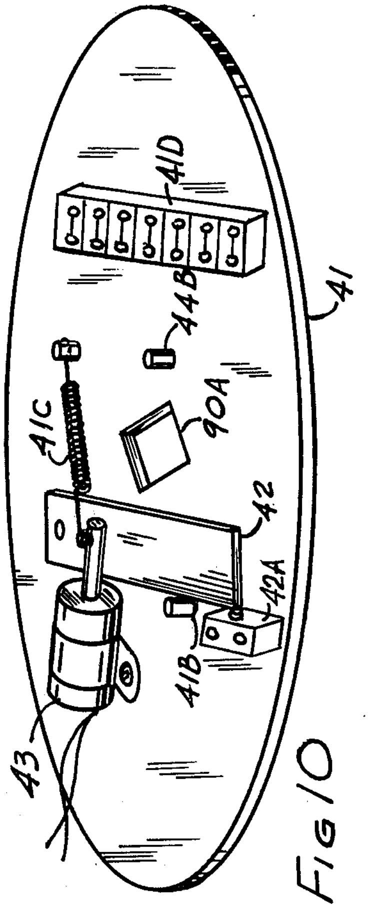
FIG. 10 is an enlarged detail perspective view of the aperture plate assembly of the master (wet) side system projection housing as shown in FIG. 2A, with the time delay switch energized by the yellow safety filter that is swung out of the white light path by the energized solenoid.
Figure 10A:
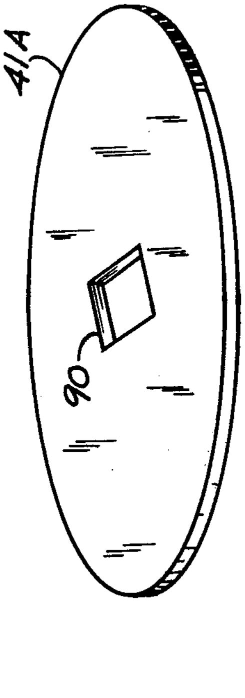
FIG. 10A is an enlarged perspective view of the aperture plate of the point source light housing assembly as shown in FIG. 2B.

The master (wet) side lettering and display typography system which is shown in FIGS. 1, 2, 2A, 10, 12, 13, 16, 16A, 17 and 18, comprises a projection housing 5 shown in FIG. 2A. The projection housing 5 is constructed of metal with natural heat convection openings around the top. This housing contains a white light photo flood bulb 5A, two plano-convex condensing lenses 5B and 5C of dissimilar focal lengths, 5B having a 6 and ½ inch focal length, and 5C having a 12 inch focal length, with both lenses 5B and 5C having their convex surfaces facing the photo flood lamp 5A. This non-conventional system intensifies the illumination by concentrating only the 'hot spot' area of the photo flood bulb 5A that projects through aperture 90A. Also contained in the projection housing 5, is a safety yellow-amber filter strip 42 that is electrically pivoted away from, then directly returned to cover aperture 90A of aperture plate 41 by solenoid 43 and return spring 41C. This detail is shown in FIG. 10.

The safety yellow-amber filter strip 42 is directly over aperture 90A when the solenoid 40 is deenergized and is held against pin stop 44B by the return spring 41C.

When the master switch 23, as shown in FIG. 1, is moved to the "on" position, the photo flood bulb 5A is energized by low voltage current of such intensity as is required to project a yellow safety light when the low voltage white illumination projects through the safety yellow-amber filter strip 42, following a path through aperture 90A, through a single selected font character of the master (wet) side font disk 1-M and through the master (wet) side aperture 90A, through the upper bellows 2, the wide open f 2.5 lens 22A, the bottom bellows 8, then through the inverted developer tank 74 onto the chloride photo paper 93D that is immersed under the developing solution 96.

Figure 18:
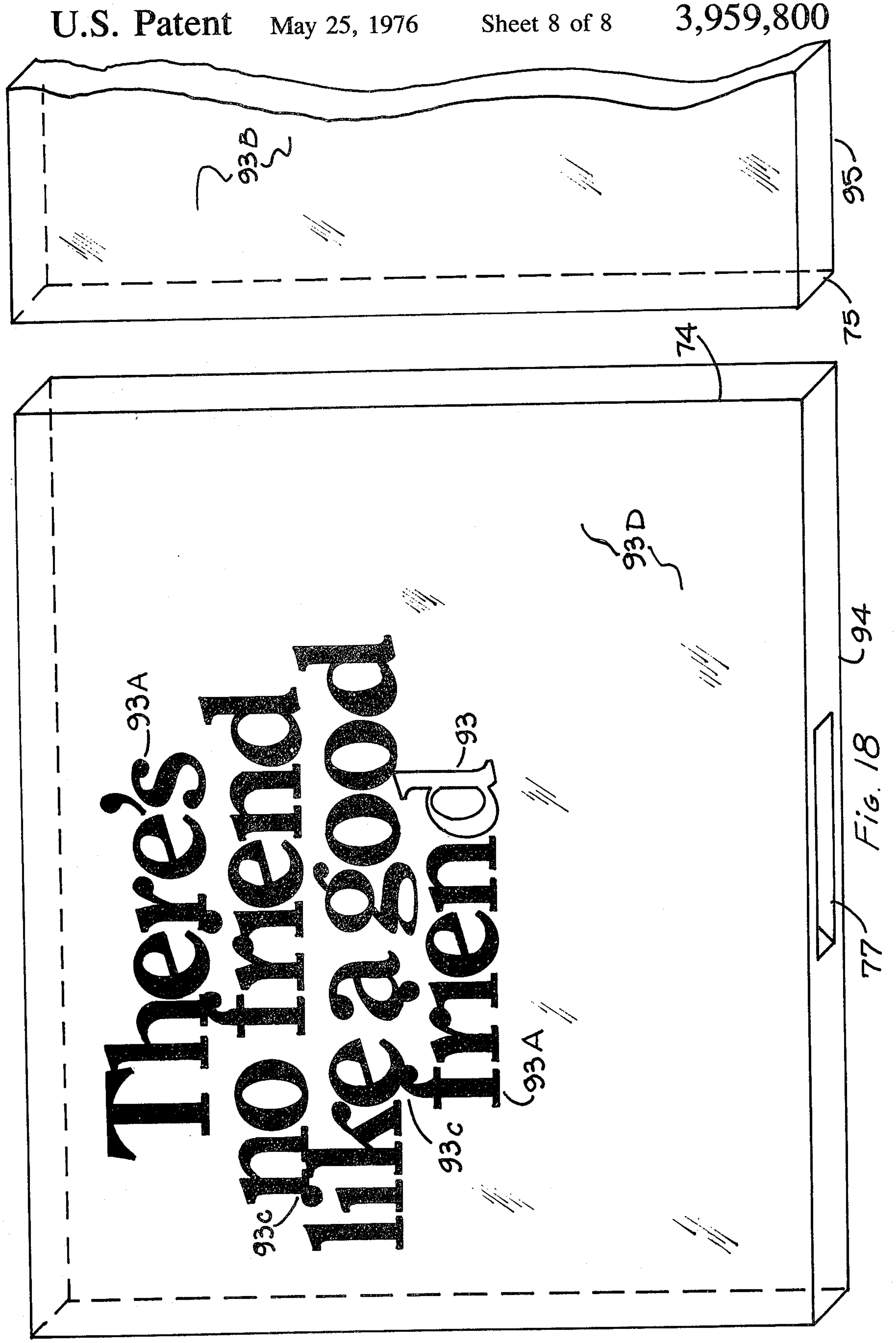
FIG. 18 is an isometric view of the partially completed, master (wet) side photo paper sheet of display typography under the acrylic plastic block, inverted developing tank with the last font character, "d", in outline to represent the yellow-illuminated spacing control image as seen by the operator prior to exposure to white light, and also illustrating the overlapping of certain font characters as used in line-over-line display typography composition and the montage of character elements for Oriental or other vertically displayed words or phrases.

This projected yellow-amber image 93, as shown in FIG. 18, is visible to the operator through the viewing section that is comprised of the collapsible viewing hood shield 10 and the operator viewing window 9, as indicated in FIG. 1. This viewing area is located on the main housing 10A and is mounted in a position above, and in front of, the developer tank 74. The collapsible viewing hood 10 is constructed of an opaque material and, when collapsed, completely covers the viewing window 9, depresses the darkroom light switch 9A, totally darkening the inside of the entire master (wet) side section. Viewing window 9 is made of a suitable yellow-amber, clear plastic to enable the operator to see the projected yellow image 93 of each font character.

The projected image from font 1-M through the yellow safety filter 42, does not expose the sensitized material 93D and the operation may adjust the projected yellow image size and shift the location of the yellow image 93 by moving motion knobs 14 and 15 as the font character is viewed through the viewing window 9.

Figure 13:
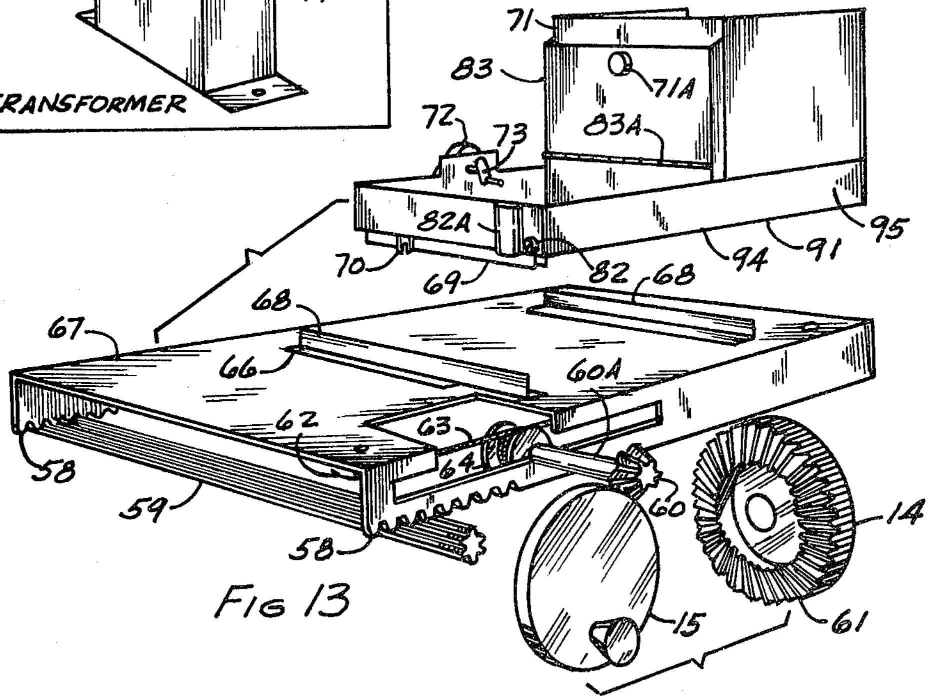
FIG. 13 is a partly exploded, detail perspective view of a conventional longitudinal and transverse motion mechanism for positioning of the adjacent master (wet) and slave (dry) side systems' photo paper easels' base unit.

The bellows frame 21A is rigidly constructed and attached to the bellows frame base 20A that is slidable transversly as shown in FIG. 1. It extends into the master (wet) side area darkroom and is welded or bolted to the top left edge of the transverse motion platform 67 as shown in FIG. 13. Rotation of the knurled knob 14 creates the exact transverse motion of the bellows frame 20A from the base 21A and the transverse platform 67. The frame 19A that houses the hand access cuffs 20, as shown in FIG. 1, is hinged across its bottom section and is opened by pulling the entire frame 19A down and away from bellows frame 21A, detaching it from an internal magnetic block that is securely mounted onto the bellows frame 21A of the transversing bellows 19. The purpose of hinging the frame 19A is for access into the master (wet) side section for removal and cleaning of the developer tank 74, loading and discarding of photo paper 93D, and exchanging of photo solutions.

Figure 16:
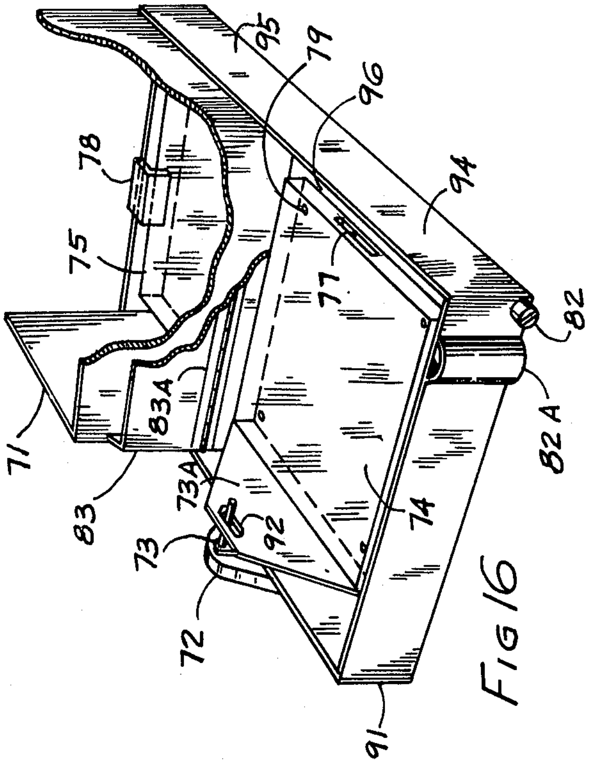
FIG. 16 is an inside perspective view of the photo paper adjacent sides, dual easel tray base unit, showing the master (wet) side system, clear acrylic plastic block, inverted developer tank, lifter slot, agitator motor, drain plug and filler tube with the slave (dry) side section acrylic plastic easel weight and optical compensator, lifter bar and darkroom wall baffle, combined with a paper storage safe.
Figure 17:
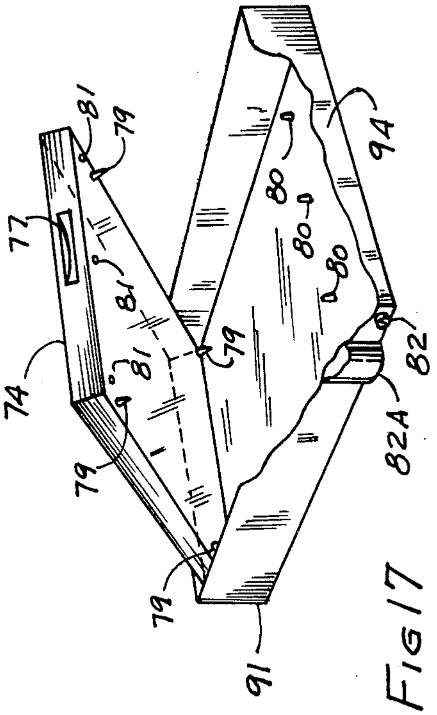
FIG. 17 is a detail isometric view of the master (wet) side section easel tray system, illustrating the acrylic plastic block inverted developer tank, standoff buttons, photo paper register pins, paper easel tray base, the filler tube and drain plug.
Figure 14:
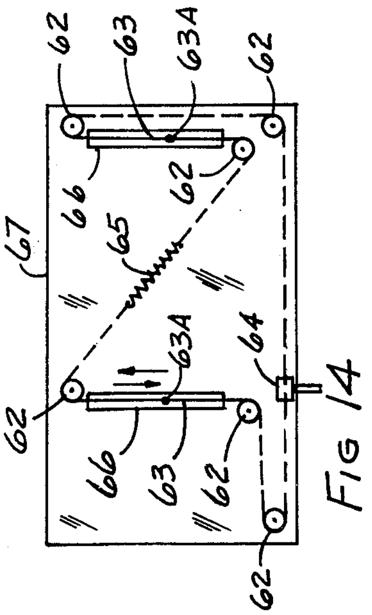
FIG. 14 is a bottom plan schematic view of the known art cable drive system linkage for a longitudinal motion mechanism as shown in FIG. 13.
Figure 15:
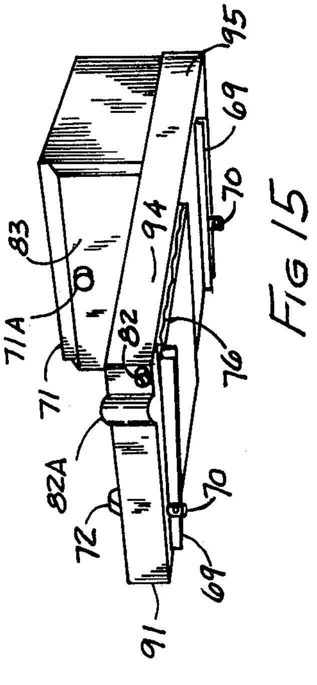
FIG. 15 is a detail perspective view of the photo paper, dual easel tray base unit, wet side paper safe, heating pad and cable yokes for attachment to the cable drive as shown in FIGS. 13 and 14.
Figure 16A:
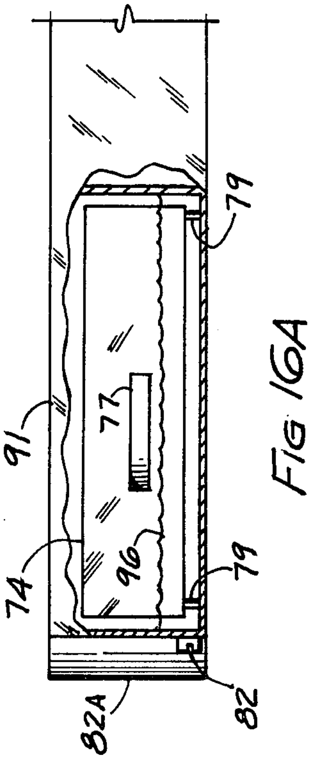
FIG. 16A is a front cross-sectional view of the master (wet) side acrylic plastic block, inverted developing tank, the standoff buttons that rest on the photo paper and allow for a thickness of developer over the photo paper, the side walls forming a developing tray, the level of the developer solution and the base of the easel tray.

The construction of the transversing platform 67, the tray base unit 91, the light baffle 71, the paper safes 83 and 25, as shown in FIGS. 2, 13, 14, 15, 16, 16A and 17, are of stainless steel. All aforementioned stainless steel units are constructed by inexpensive overlap and spot-welding sheet metal techniques, other than the master (wet) side 94 of base unit 91 (as best shown in FIGS. 16 and 17) which is heli-arc welded where water tightness is required.

The developer tank 74 and the optical compensator weight 75 are both made of a clear, flat block of solid acrylic plastic (such as Plexiglas) with the outer edge on all four sides of each unit painted with a glossy, black polystyrene lacquer. The purpose of this black opacity is to prevent glare and reflection from the white light of a projected character image that is close to the edge of either of these two plastic units which could cause edge fog on the two sheets of sensitized photo paper in the master or slave (wet or dry) areas.

The base cabinet 28 as best shown in FIG. 1 is constructed of ¾-inch plywood for its structural and insulation properties for maintaining a constant internal temperature of 135° F. What follows is a detailed description of the construction, arrangement of well known electrical and electronic components in the art, the wiring, and details of the exact sequence of the entire electrical operation of this invention.

The three-wire (current and ground) electrical cord remains constantly plugged into a grounding wall outlet (115 VAC). The current conductors connect directly to the 55-watt heating pad 76 that is under the master (wet) side system 94 of the developer tank 74 of the easel tray base unit 91 and the heating pad 9D in the base cabinet 28, through their respective thermostats, maintaining a 135° F. temperature at all times in these areas. Thus, continuous temperature control is achieved whether or not the machine is in use.

The current and ground are then attached to a multiple station main terminal strip 9B and from this terminal strip 9B, lead to the slave (dry) side system stabilization photo developing processor 26 through its switch 26A that is mounted on the processor 26 inside the slave (dry) side darkroom section 95. The processor 26 will continue to run even though the operator shuts off the master switch 23 on the main housing 10A, thus preventing entrapment of an incomepletely developed photo print within the processor 26.

Figure 11B:
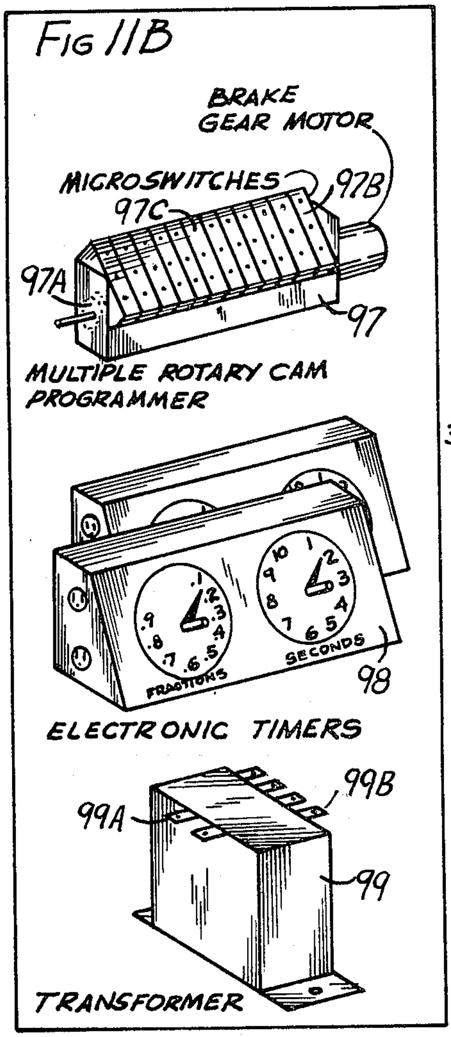
FIG. 11B is a perspective view of two typical electronic timers, a typical transformer with a low and high set of voltage taps and a typical multiple stack of rotaty cams and microswitches that program and control all the electro-mechanical and electronic motions, timing and illumination of the adjacent wet and dry side systems.

The current conductors also lead from the main terminal strip through the on/off switch 23 and are connected to the input side multiple tap 99A of the high and low voltage transformer 99. The current and ground conductors are then connected to the gear driven programmer 97 with its multiple stacked rotary cams 97A and multiple stacked triple pole microswitches 97B with combination terminals 97C on each, for a choice of either the normally open or normally closed current as shown in FIG. 11B. The circuit to the programmer 97 is kept normally open and is activated or closed through the contact of exposure button 16. The current conductors are also wired from the low side taps 99B of the transformer 99 through a closed microswitch 97B of the programmer 97, sending low voltage current directly to the photo flood bulb 5A as soon as the master switch 23 is turned on.

The current conductors are connected from the high side taps 99B of the transformer 99 to the programmer 97 and then to a terminal strip 41D that is mounted on the aperture plate 41 shown in FIG. 10, in the projection housing 5. From this terminal strip 41D, the current conductors are connected to the solenoid 43 and from this terminal strip 41D, to a normally "off" microswitch 42A that is securely mounted to the aperture plate 41 in a position at the end of the safety filter 42 in such a way that motion of the safety filter 42 closes the circuit of the microswitch 42A, feeding 115 VAC current to both electronic automatic reset timers 98 as shown in FIG. 11B. These timers 98 then energize the photo flood lamp 5A and the point source light 6A to the prior selected exposure time duration.

The purpose of the safety filter 42 closing the circuit of the microswitch 42A that is mounted on aperture plate 41 (after safety filter 42 is swung away from aperture 90A) is to energize the photo flood 5A a fraction of a second later to prevent the tapering off of the white light path at one side of aperture 90A. In this inventor's prior invention, Friedel, U.S. Pat. No. 3,080,802, the safety filter is energized simultaneously with the white exposure light and a slight under-exposure of a font character would indicate weaker development on one side of the developed character image. What is newly created in this present invention is a time delay of a fraction of a second for the safety filter 42 to clear the aperture 90A prior to exposure by white light.

The master switch 23 also directs the current through the enlarge/reduce momentary contact switches 17 and 18, shown on FIG. 1, to the reversible drive brake motor 33. The current and ground conductors are also connected to the agitator motor 72 through programmer 97.

Current conductors are also connected to the master pilot light 23 and through a momentary normally "on" switch button 9A which energizes a 5-watt yellow-amber bulb 23A that is housed in the master (wet) side system for safe light viewing illumination of that inside area.

Collapsing of the viewing hood 10 depresses the momentary contact switch button 9A that deenergizes the 5-watt yellow-amber bulb.

Now referring to the actual operation of this invention, the operator turns on the master switch 23, inserts his hands into the wet side section hand access cuffs 20, places a sheet of photo paper 93D from the paper safe 83 onto the register pins 80 under the developing tank 74. He then fills the air space created by the standoff buttons 79 under the developing tank 74 with developer 96 and then inserts his hands into the slave (dry) side access cuffs 21, placing a sheet of photo paper 93B from the paper safe 25 under the optical compensator block 75. He then seats himself at the front of the machine, depresses the enlarge switch 17 or the reduce switch 18 that activates the reversible gear motor 33 which imparts vertical motion to the lensboard 3 and the font disks base 4. The pointer 24 indicates the selected percentage size of the font character. The operator then looks in through the viewing window 9 and sees a projected, illuminated yellow image 93 of a single font character. He now inserts the dialing stylus 87 into the desired character button 46 on the character dialing disk 11 and rotates the selected character to the character toggle stop 12. He immediately sees projected onto the sensitized paper 93D, the desired, selected yellow light illuminated character 93. He then positions the character to the desired location on the photo paper 93D by rotating knobs 14 and 15. He next depresses the exposure switch 16 and the character is exposed by a white light path from the photo flood bulb 5A which instantly develops the character to a black image 93A while simultaneously a white light exposure is made of the exact duplicate character in the slave (dry) side easel system 95 onto the slave (dry) side photo paper 93B and is retained as a latent image for subsequent development within the machine through the processor 26. The operator now selects the next desired character which, again, becomes visible in the form of a yellow image 93 and then advances the entire dual easel tray base 91 to the left, using the knurled knob 14, to the desired spacing or overlapping of the prior now visible black character image 93A and the now visible yellow character image 93 as shown on FIG. 18. Once again, he depresses the expose switch 16 and the second yellowlit character 93 develops instantly into a black image 93A. Following this procedure, he continues with the same operational motions of spacing and exposing until the entire word, words or line of typography is completed from left to right, right to left or up and down. The operator then rotates the spinner knob 15 and the knurled knob 14, moving the entire paper easel tray base unit 91 into position for commencing composition of the second line, or the second letter of an Oriental character, continuing in this manner from line-over-line to completion. He then inserts his hands into the slave (dry) side system access cuffs 21, turns on the processor 26 with switch 26A and inserts the photo paper 93B containing the latent images, into the processor slot 26B for automatic development.

With the full motion controls afforded the operator, he can overlap, bouce, interlock, kiss or space out any combinations of characters horizontally or vertically over an entire sheet of photographic paper.

Should the operator be interrupted for only a few minutes prior to the completion of the entire composition, he merely drops down the collapsible viewing hood unit 10 which depresses switch 9A that turns out a 5-watt yellow-amber illumination, darkening the entire inside area of the master (wet) side composing compartment 94, and shuts off the master switch 23.

Should the operator be interrupted for several hours or up to several weeks, he drops the collapsible viewing hood 10, shuts off the master switch 23, drains the developer solution 96 from the developing tank 74, refills that area with a 2 and ½ percent acetic acid (short stop) solution for approximately ten seconds, and then drains the acetic acid solution, leaving the chloride photo paper 93D in a damp condition until he is ready, once again, to continue composition on that sheet to completion.

As the exposures by white light onto both sensitized photographic papers 93B and 93D are completed simultaneously, and the yellow filter 42 returns over aperture 90A, the agitator motor 72 that is secured to the tray base unit 91, rotates the eccentric cam 73, rocking vertical plate 73A which is securely attached to the developer tank 74, up and down for a split second in order to diffuse the bromide ion into the developing solution 96 and push out any air bubbles that may have formed in the developer. The bromide ion is a reaction product of the photographic development process. It is a well established fact that as the developer converts the exposed silver salts to metallic silver, soluable halides (bromides and chlorides) are released into the developer. The bromide ions are an effective restrainer to the development process, retarding completion of the reduction of silver to the metallic state, said metallic silver producing the dense, black photographic image. With bromide ions preventing completion of the reduction reaction, light colored areas adjacent to the black images occur and are well known as "bromide drag" or "adjacency effect" depending upon the appearance of the desensitized area. Agitation is necessary to remove bromide ions in order to prevent these effects.

In this inventor's prior invention, Friedel, U.S. Pat. No. 3,115,815, the bromide ion is always washed to the left by specific gravity force action of each fresh drop of developer solution that enters the small developing tank since each font character is exposed on the right side only, adjacent to the prior-developed black character.

A major purpose of the requirement for the clear 1-inch thick developer tank 74, is to provide the means for elimination of flare from the projected character image 93. The phenomenon of flare affects the photographic process as follows:

A meniscus of developer, regardless of how thin the layer might be, when poured over a sheet of photo paper, creates a flare around the entire periphery of a character that is projected onto the photo paper through said thickness of a developing solution 96 and produces a fuzzy image upon exposure of the character image by white light. Increasing the depth of the developing solution 96 over the photo paper 93D to a minimum of a 1-inch thickness, as in a developing tray, eliminates the flare or fuzziness. However, agitation of the developer would create motion of the liquid and attendant optical effects. The placement of a solid, clear block 74 of a 1-inch thick acrylic plastic over a ⅛ inch thickness of developer solution 96, combines the solution 96 and the block 74 into one optical unit, directing the projected image clearly and sharply onto the photo paper 93D. Split-second agitation by motor cam eccentric 73 of the developer solution 16 by the rapid lift and return of one edge of the acrylic block 74, instantly applies the developer solution 96 to the clear plastic block 74, forming a unitary optical unit and instantly stills the motion of the developer solution 96 under the block 74 for continued operation without hesitation.

With the present invention, the means for agitation and the diffusion of the bromide ion into the developing solution 96, eliminates desensitization of the photographic paper 93D around the entire periphery of the developed black image 93A, affording the operator the ability to expose character images from left to right, right to left, and/or above and below each other. This method of bromide ion diffusion makes possible the operator's producing interlocked characters 93C, framed borders, or overall pattern background tints over an entire sheet of photographic paper 93B and 93D. A single negative film art design or emblem, etc. can be projected from either concentric ring, 85 or 86, of the identical font disks 1-M, 1-S. This system also is capable of photograhic lettering and display typography composition with Oriental language and ancient or modern Semitic language character composition that requires composing from right to left or top to bottom.

Regarding Oriental languages that require more than two concentric rings of characters, this invention (as best shown in FIG. 2) illustrates the ease and rapidity of changing identical font disks 1-M and 1-S to any additional font disks 1-M and 1-S of differing Oriental characters by simply lifting the projection housings bar 29 and inserting stylus 87 into any character button 46.

A preferred developing solution that is an improvement over this inventor's prior formula described in Friedel U.S. Pat. No. 3,115,815 in conjunction with the present photographic device is as follows:

Water, 125°, 20 ounces
*Metol, 50 grains
Sodium sulphite, dessicated, 2 oz. 225 grains
Hydroquinone, 165 grains
Sodium carbonate monohydrated, 1 oz. 235 grains
Potassium bromide, 10 grains
Cold water to make 32 ounces, then dilute 1 to 2 before using.

*Metol referred to herein above is also sold by different firms under the trade names Rhodol, Elon, Genol, etc.

From the foregoing it will be seen that there are provided two dissimilar photographic lettering and display typograhy systems, mechanically combined into one unitary, simultaneously controlled typography device which is capable of a variety of photo typography composing operations, all of which may be carried out in normal room illumination without any concern as to fog or streaks that may occur on the chloride photo paper 93D in the visual master (wet) side composing section that permits the operator to watch the spacing and formation of each font character and to adjust and arrange same as imprinting progresses. Each font character is instantly developed under the yellow safetyfilter viewing window so that the operator can, at all times, be aware of the exact spacing of the font characters before and after imprinting. A novel photographic technique has also been provided whereby the projected letters are recorded in latent image form on sensitized paper 93B of the slave (dry) side unit 95 that duplicates exactly what the operator performs on the master (wet) side visual area 94.

ABSTRACT OF THE DRAWINGS

In the drawings, like numbers refer to like parts, and for the purposes of explication, marshalled below are numbered parts of a Unitary Photographic Lettering and Display Typography Composing Device.

UNITARY PHOTOGRAPHIC LETTERING AND DISPLAY TYPOGRAPHY COMPOSING DEVICE

| Number | PART NAME | Shown in Figures |
|---|---|---|
| 1-M | FONT DISK (MASTER, WET SIDE) | 1, 2, 11, 11A, 11C |
| 1-S | FONT DISK (SLAVE, DRY SIDE) | 1, 2, 11, 11A, 11C |
| 2 | UPPER BELLOWS (IDENTICAL) | 1, 2, 3 |
| 3 | LENSBOARD ASSEMBLY (DUAL DISSIMILAR LENSES) | 1, 2, 3, 12 |
| 3A | SPRING LOAD | 12 |
| 4 | FONT DISKS BASE ASSEMBLY | 1, 2, 3, 3B |
| 4A | FONT DISKS SHIFTING PLATE RACK | 3, 3B |
| 4B | FONT DISKS SHIFTING PLATE | 3 |
| 5 | PROJECTION HOUSING (MASTER, WET SIDE) | 1, 2, 2A, 2B |
| 5A | PHOTO FLOOD BULB | 2A |
| 5B | PLANO-CONVEX CONDENSER LENS (6½"FOCAL LENGTH) | 2A |
| 5C | PLANO-CONVEX CONDENSER LENS (12"FOCAL LENGTH) | 2A |
| 5D | VENT HOLES (HEAT CONVECTION) | 1, 2, 2A |
| 6 | PROJECTION HOUSING (SLAVE, DRY SIDE) | 1, 2, 2B |
| 6A | POINT SOURCE LIGHT BULB | 2B |
| 6B | CONDENSOR LENSES | 2B |
| 7 | POSITIVE REGISTER LOCK HOUSING | 1, 3. |
| 8 | LOWER BELLOWS (IDENTICAL) | 1, 2, 3 |
| 9 | OPERATOR VIEWING WINDOW | 1 |
| 9A | SWITCH (MOMENTARY - NORMALLY CLOSED) | 1 |
| 9B | TERMINAL STRIP | 1 |
| 9C | SHELF | 1 |
| 9D | HEATING PAD | 1 |
| 10 | VIEWING HOOD SHIELD (COLLAPSIBLE) | 1 |
| 10A | MAIN HOUSING | 1, 1A, 2, 3, 5A |
| 10B | HINGE (VIEWING HOOD) | 1 |
| 11 | CHARACTER SELECTOR DIAL | 1, 2, 4, 5, 5A, 7, 8, 9 |
| 12 | TOGGLE STOP (SELECTED CHARACTER | 1, 4, 8, 9 |
| 13 | SHIFTING LEVER (DISSIMILAR FONT STYLES) | 1, 1A |

-continued

UNITARY PHOTOGRAPHIC LETTERING AND DISPLAY TYPOGRAPHY COMPOSING DEVICE

| Number | PART NAME | Shown in Figures |
|---|---|---|
| 13A | FLEXIBLE CABLE TERMINAL | 1A |
| 13B | FLEXIBLE CABLE CLAMP | 1A |
| 14 | KNURLED KNOB (LONGITUDINAL MOTION) | 1, 13 |
| 15 | SPINNER KNOB (TRANSVERSE MOTION) | 1, 13 |
| 16 | EXPOSURE SWITCH (WHITE LIGHT) | 1 |
| 17 | ENLARGE SWITCH | 1 |
| 18 | REDUCE SWITCH | 1 |
| 19 | TRANSVERSING BELLOWS | 1 |
| 19A | HINGED FRAME (HAND ACCESS CUFFS) | 1 |
| 20 | HAND ACCESS CUFFS | 1 |
| 20A | BELLOWS BASE | 1 |
| 21 | HAND ACCESS CUFFS | 2 |
| 21A | HINGED FRAME (BELLOWS) | 1 |
| 22 | LENS DIAPHRAGM CONTROL LEVERS | 1, 2, 3, 12 |
| 22A | LENSES (DISSIMILAR DIAMETERS-EXACT FOCAL LENGTH) | 1, 2, 3, 12 |
| 22B | AUTOMATIC DIAPHRAGM CONTROL | 1, 2, 3 |
| 23 | MASTER SWITCH AND PILOT LIGHT | 1 |
| 23A | RUBY LAMP | 1 |
| 24 | SCALE AND POINTER | 1 |
| 25 | PAPER STORAGE SAFE (SLAVE, DRY SIDE) | 1, 2 |
| 25A | COVER (PAPER STORAGE SAFE) | 2 |
| 26 | PROCESSOR (STABILIZATION PHOTO DEVELOPING) | 1, 2 |
| 26A | MASTER SWITCH AND PILOT LIGHT | 2 |
| 26B | ENTRY SLOT (STABILIZATION PROCESSOR) | 2 |
| 27 | RACKS (LENSBOARD) | 1, 2, 12 |
| 27A | MALE ROD (TELESCOPING ASSEMBLY) | 1, 2 |
| 27B | FEMALE HOUSING (TELESCOPING ASSEMBLY) | 1, 2 |
| 27C | CONSTANT FORCE SPRING | 2 |
| 27D | SUPPORT (CONSTANT FORCE SPRING) | 2 |
| 27E | PIN SLOT | 2 |
| 27F | PIN (TELESCOPING MALE ROD) | 2 |
| 28 | STORAGE CABINET (TEMPERATURE CONTROLLED) | 1, 2 |
| 28A | CABINET KNOBS | 1 |
| 29 | HINGED LIGHT BRACKET (FONT REPLACEMENT) | 1, 2 |
| 29A | HINGE (LIGHT BRACKET) | 2 |
| 30 | RIGHT ANGLE BEVEL GEAR BOX | 3A, 3B |
| 30A | RIGHT ANGLE BEVEL GEARS | 3A |
| 31 | FLEXIBLE SHAFT | 2, 3, 3A, 5A |
| 32 | RACK SLIDES | 1, 2, 12 |
| 33 | DRIVE MOTOR (REVERSIBLE GEAR) | 2, 12 |
| 34 | SHIFT CABLE (FONT DISKS) | 1, 1A, 2, 3, 3B |
| 35 | RACK AND PINION SHIFT LEVER (FONT DISKS) | 3, 3B |
| 35A | PINION SHAFT | 3B |
| 36 | TURNTABLE GEARS (FONT DISKS) | 3, 3A |
| 36A | GEARED PLATE (BELT DRIVEN) | 3 |
| 37 | IDLER GEAR | 3 |
| 37A | TIMING BELT | 3 |
| 38 | FONT DISKS ALIGNMENT PINS | 1, 2, 3, 3A |
| 39 | POSITIVE REGISTER LOCK (FONT DISKS) | 3, 11, 11C |
| 39A | COMPRESSION SPRING | 3, 11 |
| 39B | LOCK PIN (TAPERED, FONT CHARACTER CENTERING) | 3, 11, 11C |
| 40 | POSITIVE REGISTER LOCK SOLENOID | 3, 11 |
| 40A | SOLENOID SHAFT | 3, 11 |
| 40B | METAL FRAME | 3, 11 |
| 41 | APERTURE PLATE ASSEMBLY | 2A, 10 |
| 41A | APERTURE PLATE | 2, 10A |
| 41B | PIN STOP | 10 |
| 41C | RETURN SPRING | 10 |
| 41D | TERMINAL STRIP | 10 |
| 42 | FILTER STRIP (SAFETY YELLOW-AMBER PLASTIC) | 2A, 10 |
| 42A | SWITCH (HIGH VOLTAGE TIME DELAY | 10 |
| 43 | SOLENOID (FILTER STRIP ACTUATING) | 2A, 10 |
| 44 | SUPPORT ROLLERS (FONT DISKS) | 3, 11 |
| 44B | PIN STOP | 10 |
| 45 | ALIGNMENT PIN HOLE (FONT DISKS, TO RECEIVE PIN 38) | 11, 11A |
| 46 | CHARACTER SELECTOR BUTTON (TEFLON) | 4, 5, 6, 7, 8, 9 |
| 47 | BRASS CONTACT RING (ELECTRIC) | 4, 5A, 7 |
| 48 | BRASS CONTACT SPIDER (INSULATED CENTER ELECTRIC) | 4, 5A, 7 |
| 48A | SPACE CORE | 5A |
| 48B | CARRIAGE BOLT | 1, 5A |
| 48C | THRUST BEARING | 5A |
| 48D | THREADED STOP NUT | 5A |
| 48E | SET SCREW | 5A |
| 48F | TEMPERED SPRING WASHER | 5A |
| 49 | CURVED SLOT (LOGARITHMIC) | 1, 2, 3 |
| 50 | SQUARE OPENING (CHARACTER SELECTOR DIAL) | 4, 5, 5A |
| 51 | MOUNTING TABS | 4, 5A |
| 51B | TAB RETAINER RECESS | 5A |
| 52 | STOP PIN | 1, 4, 8, 9 |
| 53 | CAM | 12 |
| 54 | STRAP | 2, 12 |
| 55 | FREE PULLEY | 2, 12 |
| 56 | GEAR BOX | 12 |
| 57 | PINION GEARS (FONT DISKS BASE) | 12 |
| 58 | MOTION RACK (LONGITUDINAL) | 13 |
| 59 | MOTION PINION (LONGITUDINAL) | 13 |
| 60 | BEVEL PINION | 13 |
| 61 | BEVEL GEAR | 13 |
| 62 | PULLEYS (DRIVE CABLE) | 13, 14 |
| 63 | CABLE | 13, 14 |

-continued

| UNITARY PHOTOGRAPHIC LETTERING AND DISPLAY TYPOGRAPHY COMPOSING DEVICE | | |
|---|---|---|
| Number | PART NAME | Shown in Figures |
| 63A | YOKE (CABLE BUMP) | 14 |
| 64 | CAPSTAN | 13, 14 |
| 65 | EXTENSION SPRING | 14 |
| 66 | SLOTS | 13, 14 |
| 67 | PLATFORM (TRANSVERSING) | 13, 14 |
| 68 | TRACKS | 13 |
| 69 | GUIDES | 13, 15 |
| 70 | CABLE YOKE | 13, 15 |
| 71 | LIGHT BAFFLE | 13, 15, 16 |
| 71A | PAPER SAFE KNOB | 13, 15 |
| 72 | AGITATOR MOTOR (100 RPM) | 13, 15, 16 |
| 73 | ECCENTRIC | 13, 16 |
| 73A | VERTICAL PLATE | 16 |
| 74 | DEVELOPER TANK (ACRYLIC, CLEAR PLASTIC, INVERTED) | 16, 17, 18 |
| 75 | OPTICAL COMPENSATOR (ACRYLIC CLEAR PLASTIC) | 16, 18 |
| 76 | HEATING PAD (THERMOSTAT CONTROLLED) | 15 |
| 77 | LIFTER SLOT | 16, 16A, 17, 18 |
| 78 | LIFTER BAR | 16 |
| 79 | STANDOFF BUTTONS | 16, 16A, 17 |
| 80 | ALIGNMENT PINS | 17 |
| 81 | ALIGNMENT PIN HOLES | 17 |
| 82 | DRAIN PLUG | 13, 15, 16, 16A, 17 |
| 82A | SOLUTION FILLER TUBE | 13, 15, 16, 16A, 17 |
| 83 | PAPER SAFE (MASTER, WET SIDE SYSTEM) | 13, 15, 16 |
| 83A | PIANO HINGE | 13, 16 |
| 84 | REGISTER LOCK HOLES (TAPERED) | 11, 11A, 11C |
| 85 | ITALIC FONT (SLANTED) | 11A |
| 86 | ROMAN FONT (VERTICAL) | 11A |
| 87 | DIALING STYLUS | 7 |
| 88 | PIVOT DIAL | 1, 4, 8, 9 |
| 89 | CENTERING HUB SHAFT | 1, 2, 3, 3A |
| 89A | FONT CENTER HOLE | 11, 11A |
| 90 | APERTURE (LIGHT PATH) | 2B, 10A |
| 90A | APERTURE (LIGHT PATH) | 2A, 10 |
| 90B | APERTURE (LIGHT PATH) | 3 |
| 90C | APERTURE (LIGHT PATH) | 3 |
| 91 | TRAY BASE UNIT (DUAL PHOTO PAPER EASEL) | 15, 16, 17 |
| 92 | SLOT (ECCENTRIC MOTION) | 16 |
| 93 | COMPOSING IMAGE (YELLOW, MASTER, WET SIDE) | 18 |
| 93A | INSTANT DEVELOPED IMAGES (MASTER, WET SIDE) | 18 |
| 93B | UNDEVELOPED LATENT IMAGE (SLAVE, DRY SIDE) | 18 |
| 93C | VERTICAL OVERLAP OF CHARACTERS (MASTER, WET SIDE) | 18 |
| 93D | CHLORIDE PHOTO PAPER (MASTER, WET SIDE) | 18 |
| 94 | BASE UNIT 91 (MASTER, WET SIDE) | 13, 15, 16, 17, 18 |
| 95 | BASE UNIT 91 (SLAVE, DRY SIDE) | 13, 15, 16, 18 |
| 96 | DEVELOPER SOLUTION (MASTER, WET SIDE) | 16A |
| 97 | PROGRAMMER (ELECTRICAL) | 11B |
| 97A | ROTARY CAMS (MULTIPLE STACKED) | 11B |
| 97B | MICROSWITCHES (MULTIPLE STACKED) | 11B |
| 97C | TERMINALS (NORMALLY ON, NORMALLY OFF) | 11B |
| 98 | ELECTRONIC TIMERS (WHITE LIGHT CONTROL) | 11B |
| 99 | TRANSFORMER (MULTIPLE TAP, HIGH & LOW VOLTAGE) | 11B |
| 99A | TAPS (INPUT) | 11B |
| 99B | TAPS (OUTPUT, HIGH OR LOW VOLTAGE) | 11B |

From the foregoing it will be seen that there has been provided a unitary photographic lettering and display typography composing device which is capable of display lettering in a wide variety of languages, all of which may be carried out in normal room illumination without concern as to the quality of the visually developed control print. The apparatus permits the operator to watch the formation of each character, each space, each word, and to adjust and arrange them as the photo lettering progresses. Each letter is instantly developed in full view over the entire sensitized sheet so that the operator at all times can be aware of the spacing of the characters produced. There has also been provided a novel developing technique whereby instantly developed projected letters in the master (wet) side system are also recorded on sensitized paper in an adjacent slave (dry) side unit in the form of a latent image for subsequent development within the device upon completion of the typography composition.

The foregoing description and drawings merely show embodiments for the purpose of illustration only, and the invention is not limited thereto. Various changes may be made in the construction without limitation of, or departure from, the spirit and scope of this invention or sacrificing any of the advantages thereof inherent therein.

Having thus fully described the invention, what is claimed as new and desired to be secured by Letters Patent of the U.S. is:

1. A unitary master and slave photographic lettering and display typography composing device comprising a base cabinet (28), a main housing (10A) supported thereon, a master light projection housing (5) and a slave light projection housing (6) mounted on said main housing (10A) and said base cabinet (28), each projection housing having a pair of condensing lenses (5B, 5C and 6B 6B) light projection lamps (5A, 6A) therein, a pair of identical character font disks (1-M, 1-S), rotatably mounted above the font disks base assembly (4), each font disk having circularly located transparent font characters (85, 86) mounted in a surrounding area of opaque material in each said font disk, a condenser lens means (5B, 5C and 6B, 6B) mounted in each light projection housing (5,6) between its light projection lamp and its font character disk, a manualy controllable single character selector dial (11), means

(31) connecting said selector dial (11) to each said identical font character disk (1-M, 1-S) for simultaneous rotation thereof to place its selected transparent character (85,86) in the light path from its said respective projection lamp, a projection lens menas (22A) mounted in each light path, a master wetted light sensitive photographic sheet (93D) holder base unit (94) of a tray base unit (91) for containing a wetted photographic sheet (93D) and a photographic developer solution (96) in the light path of said master projection housing (5), a slave dry light sensitive photographic sheet (93B) holder base unit (95) of said tray base unit (91) in the light path of said slave projection housing (6), said projection lens means (22A) being between said photographic sheets 93D, 93B) and said selected transparent characters (85,86), the master wetted sheet (93D) being insensitive to yellow light, a yellow filter strip (42) normally in the master projection light path, said master light path providing a visible temporary image (93) through said filter strip, means (22,22B,49) for adjusting both projection lens means (22A) simultaneously on their respective photographic sheets while viewing said visible image and means (42A,43) for moving said filter strip out of its light path and then simultaneously exposing both sheets to a white light path intensity, the master projection light path producing a permanent instantly visible individual black character image (93A) on its master wetted sheet (93D) while the slave projection light path produces a latent character image on said slave photo sheet (93B) for subsequent development of all latent image characters composed and exposed thereon.

2. A device as in claim 1, said master projection housing (5) containing a photo flood bulb (5A) that is constantly energized with a low voltage white light when the yellow safety plastic filter strip (42) is in position in its light path projecting the selected font character image (93) in said safety yellow illumination onto said master sensitized sheet (93D) said master sheet being a chloride paper that is insensitive to yellow light, means (14,15) for moving said sensitized sheet (93D) transversely (15) or longitudinally (14) for visually positioning said selected yellow character image (93) anywhere on said full photographic sheet (93D) in normal room illumination.

3. A device as in claim 2, whereby the actuation of an exposure switch (16) actuates solenoid (43) to move said yellow filter strip (42) out of the master light path, said yellow filter strip (42) then contacting a switch (42A) activating high voltage white light exposure of said photo flood bulb (5A) whereby upon completion of said high voltage white light exosure, said projected character image (93) instantly develops into a black character image (93A), and said yellow filter strip (42) then moves back into the master light path for continued yellow safety illumination of the next selected character.

4. A device as in claim 3, whereby motions of said yellow filter strip (42), said solenoid (43), said switch (42A) and said high and low voltage illumination of said photo flood bulb (5A) are all controlled by said exposure switch (16) which energizes a multiple rotary cam programmer (97), programming electronic timers (98) and a high and low voltage transformer (99).

5. A device as in claim 2, whereby said white light high voltage exposure of said photo flood bulb (5A) on said master wet side system (94), simultaneously with a point source light (6A) contained in said slave projection housing (6) on the adjacent slave dry side (95), projects an exact duplicate character image onto said photographic sheet (93B) in the exact same position on said slave dry sheet of photographic paper (93B), said slave dry sheet being a bromide paper, retaining a latent image for subsequent development through a processor (26) that is within said slave dry side system area.

6. A device as in claim 1, said master wet side (94) of the dual photographic sheet easel tray base unit (91) holding a full magazine-size sheet of said photographic sheets (93D) under a thickness of developing solution (96) that is formed into an optically clear developer tank (74) by a clear plastic block over said developer solution (96) elevated above said sensitized photographic sheets (93D) by standoff spacing buttons (79), said last mentioned photographic sheets (93D) being chloride paper.

7. A device as in claim 6, said developer tank (74) being comprised of a 1-inch thickness of optically clear, acrylic plastic elevated over ⅛ inch of said developer solution (96) by said standoff buttons (79), combining them into an optical unit of 1 and ⅛ inches in thickness.

8. A device as in claim 1, wherein said slave dry side system (95) of said dual photo paper easel tray base unit (91) contains said dry sheet, said dry sheet being of dry photographic bromide paper (93B), said dry sheet being held in place with a compensating thickness block of clear plastic (75).

9. A device as in claim 8, wherein said slave dry side optical compensator block (75) is of a 1 and ⅛ inch thickness of clear plastic compensating for magnification effects created by having said image (93) on said master wet side (94) project through 1 inch of clear plastic that is combined with ⅛ inch of said clear developer solution (96).

10. A device as in claim 1, said master sheet being a nonprojection chloride paper (93D), said instantly developed black image (93A) being created in only a one-half second exposure time by said projection of said white light (5A) onto said sheet of non-projection chloride photo paper (93D).

11. A device as in claim 1, said projection lamp of said master housing (5) being a photo food lamp (5A), said master wetted sheet (93D) being a slow chloride contact speed paper, said developer solution (96) being of high contrast, the combination on said master wet side system (94) of said pair of condensing lenses (5B, 5C) collimating only the hot spot area of said photo flood bulb (5A) plus the hypersensitization of said slow chloride speed photo paper (93D) soaking in said high contrast developer solution (96) plus a heating means (76) below said master wet side (94) of said tray base unit (91) causing instant development of said black character images (93A).

12. A device as in claim 1, a master developer tank (74) comprising a clear plastic block and standoff buttons (79) on said holder base unit (94), said master wet photographic sheet (93D) being in a developing solution (96) under said plastic block developer tank (74), and means (72) for vertical agitation motion at the rear of said master wet side developer tank (74) causing agitation of said developer solution (96), pushing out air bubbles and diffusing the created bromide ion, preventing desensitization of that area adjacently surrounding said developed black character image (93A) on said sheet of photographic paper (93D), said sheet being a chloride photo paper.

13. A device as in claim 12, wherein motion of said developer solution (96) is instantly stilled and said developer solution instantly combines with said developer tank (74) into a unitary optical unit upon the completion of the down stroke of said developer tank (74), all within a fraction of a second after said character mage (93A) is exposed to said white light.

14. A device as in claim 12, and a clear yellow plastic viewing window (9) provided above and in front of said developer tank (74), enabling the operator to see the entire composition from beginning to end irrespective of said chloride photographic paper (93D) fogging or staining during the operation, said chloride paper being a visual control sheet to be subsequently discarded.

15. A device as in claim 1, each said identical font disk (1-M, 1-S) being provided with two circular concentric rings of different characters (85, 86).

16. A device as in claim 15, said projection housing (5,6) having light path apertures (90, 90A) in the bottom thereof, and font disks (1-M, 1-S) base support assembly (4) having light path apertures (90B, 90C) in alignment with said projection housings light path apertures (90, 90A), means for gearing and belting both said identical font disks (1-M, 1-S) together to place the identical selected characters into their four respective light path apertures (90, 90A, 90B, 90C), with both said identical font disks (1-M, 1-S) being rotated in exact correspondence to the rotatable movement of the character selector dial (11).

17. A device as in claim 1 and positive register locks (39) mounted on said base assembly (4) correctly aligning and locking said identical characters of each of said identical font disks (1-M, 1-S) in the exact center of said two projected light paths.

18. A device as in claim 16, said font disks character selector dial providing for rapid selection of said font characters as indicated on said character dial (11) corresponding to said identical font disks (1-M, 1-S) characters.

19. A device as in claim 18, and a dialing stylus (87) for manual insertion into a recess of a character selector button (46) of said selector dial (11) to electrically energize the two said positive register locks (39) allowing free rotation of said identical font disks (1-M, 1-S) resulting from electrical contact of a brass contact ring (47) against a brass contact spider (48), both of which are unrotatably affixed to said main housing (10A).

20. A device as in claim 1, said identical font disks (1-M, 1-S) and said corresponding character selector dial (11) in combination with means (14, 15) providing the transversing and longitudinal motion of the platform (67) affixed to said tray base unit (91) and means providing diffusion by agitation of the bromide ion in said developer solution (96) whereby lettering and display typography from alphabets which require opposite directional composition and alphabets which require vertical downward overlap montage composition may be produced.

21. A device as in claim 6, wherein said developer-wetted chloride photo paper (93D) remains sensitive to light over its entire area after lengthy interruption of the typography composition operation after removal of said developer and replacement with a two and one-half percent acetic acid short stop solution for ten seconds then removal of said short stop solution and means (10) for maintaining indefinitely the paper in complete darkness for subsequent continuation of composition.

22. A device as in claim 13, wherein said master wet side chloride photo, paper (93D) is used mainly as a visual spacing and composing guide and then discarded, enabling the use of said developing solution (96) to cause an instantly inducted black character image (93A) by the reduction of the amount of potassium bromide and an increase in the amount of sodium sulphite in said developer solution (96), of which the quantity of potassium bromide is insufficient to react as a conventional restrainer and the soaking of said chloride paper emulsion (93D) in an excessive amount of sodium sulphite hypersensitizes the sensitivity of said chloride emulsion (93D) to said white light photo flood bulb (5A).

* * * * *